US012785095B2

(12) United States Patent
Koshika et al.

(10) Patent No.: US 12,785,095 B2
(45) **Date of Patent: *Nov. 3, 2026**

(54) POSITIVE ELECTRODE ACTIVE MATERIAL FOR LITHIUM ION SECONDARY BATTERY AND LITHIUM ION SECONDARY BATTERY

(71) Applicant: SUMITOMO METAL MINING CO., LTD., Tokyo (JP)

(72) Inventors: Yuki Koshika, Niihama (JP); Haruki Kaneda, Niihama (JP)

(73) Assignees: SUMITOMO METAL MINING CO., LTD., Tokyo (JP); PANASONIC ENERGY CO., LTD., Osaka (JP)

( * ) Notice: Subject to any disclaimer, the term of this patent is extended or adjusted under 35 U.S.C. 154(b) by 1098 days.

This patent is subject to a terminal disclaimer.

(21) Appl. No.: 17/625,886

(22) PCT Filed: Jun. 30, 2020

(86) PCT No.: PCT/JP2020/025731

§ 371 (c)(1),
(2) Date: Mar. 20, 2023

(87) PCT Pub. No.: WO2021/006128

PCT Pub. Date: Jan. 14, 2021

(65) Prior Publication Data

US 2024/0021808 A1 Jan. 18, 2024

(30) Foreign Application Priority Data

Jul. 8, 2019 (JP) ................................ 2019-127261

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/362* (2013.01); *H01M 4/382* (2013.01); *H01M 4/505* (2013.01);
(Continued)

(58) Field of Classification Search
CPC ...... H01M 4/366; H01M 4/505; H01M 4/525; H01M 2004/021; H01M 2004/028;
(Continued)

(56) References Cited

U.S. PATENT DOCUMENTS

2012/0135315 A1 5/2012 Niina et al.
2013/0189581 A1 * 7/2013 Imaizumi .............. H01M 4/131 429/223
(Continued)

FOREIGN PATENT DOCUMENTS

CN 108028373 A 5/2018
JP 2002-151071 A 5/2002
(Continued)

OTHER PUBLICATIONS

Extended (Supplementary) European Search Report dated Nov. 14, 2023, issued in counterpart EP Application No. 20837803.4. (8 pages).
(Continued)

*Primary Examiner* — Armindo Carvalho, Jr.
(74) *Attorney, Agent, or Firm* — WHDA, LLP

(57) ABSTRACT

A positive electrode active material that can achieve high thermal stability at low cost is provided.
Provided is, for example, a positive electrode active material for a lithium ion secondary battery, the positive electrode active material containing a lithium-nickel composite oxide having a hexagonal layered structure and configured by secondary particles with a plurality of aggregated primary particles, in which the lithium-nickel composite oxide con-
(Continued)

| | | | | |
|---|---|---|---|---|
| Ti (at%) | 0 | 2.2 | 0 | 2.2 |
| Nb (at%) | 0 | 0 | 0.5 | 0.5 |

tains lithium (Li), nickel (Ni), manganese (Mn), titanium (Ti), niobium (Nb), and optionally an element M1, an amount of substance ratio of the respective elements is represented as Li:Ni:Mn:M:Ti:Nb=a:(1−x1−y1−b−c):x1:y1:b:c (provided that, $0.97 \le a \le 1.25$, $(1-x1-y1-b-c)<0.80$, $0.03 \le x1 \le 0.35$, $0 \le y1 \le 0.35$, $0.005 \le b \le 0.05$, and $0.001<c \le 0.03$), in the amount of substance ratio, $(b+c) \le 0.06$ and $b>c$ are satisfied.

10 Claims, 12 Drawing Sheets

(51) Int. Cl.
*H01M 4/36* (2006.01)
*H01M 4/38* (2006.01)
*H01M 4/505* (2010.01)
*H01M 10/0525* (2010.01)

(52) U.S. Cl.
CPC .. *H01M 10/0525* (2013.01); *H01M 2004/027* (2013.01); *H01M 2004/028* (2013.01)

(58) Field of Classification Search
CPC ..... C01G 53/50; C01G 53/82; C01P 2006/11; C01P 2006/40
See application file for complete search history.

(56) References Cited

U.S. PATENT DOCUMENTS

| | | | | |
|---|---|---|---|---|
| 2016/0293952 | A1* | 10/2016 | Kaneda | C01G 53/82 |
| 2017/0358799 | A1* | 12/2017 | Gunji | H01M 4/62 |
| 2018/0233739 | A1* | 8/2018 | Park | C01G 53/50 |
| 2019/0115596 | A1 | 4/2019 | Kajiyama et al. | |
| 2019/0393484 | A1 | 12/2019 | Fujihara | |
| 2020/0052295 | A1* | 2/2020 | Koshika | C01G 53/00 |
| 2020/0388841 | A1* | 12/2020 | Kaneda | H01M 4/505 |
| 2021/0280864 | A1 | 9/2021 | Kaneda et al. | |
| 2022/0149351 | A1 | 5/2022 | Fujihara | |

FOREIGN PATENT DOCUMENTS

| | | | | |
|---|---|---|---|---|
| JP | 2003-308880 A | | 10/2003 | |
| JP | 2006-147499 A | | 6/2006 | |
| JP | 2007-265784 A | | 10/2007 | |
| JP | 2008-017729 A | | 1/2008 | |
| JP | 2008-117729 A | | 5/2008 | |
| JP | 2008-257902 A | | 10/2008 | |
| JP | 4807467 B1 | | 11/2011 | |
| JP | 2015-099793 A | | 5/2015 | |
| JP | 2018-534735 A | | 11/2018 | |
| JP | 2020-004537 A | | 1/2020 | |
| WO | 2011/016553 A1 | | 2/2011 | |
| WO | 2018/043669 A1 | | 3/2018 | |
| WO | WO-2018079809 A1 | * | 5/2018 | C01G 53/50 |
| WO | WO-2018123951 A1 | * | 7/2018 | H01M 4/505 |

OTHER PUBLICATIONS

Office Action dated Dec. 29, 2023, issued in counterpart CN Application No. 202080049399.6, with English translation. (16 pages).

Office Action dated Aug. 20, 2024, issued in counterpart JP Application No. 2021-530633, with English translation. (8 pages).

Extended European Search Report dated May 26, 2025, issued in counterpart EP Application No. 25155011.7. (7 pages).

International Search Report dated Aug. 11, 2020, issued in counterpart International application No. PCT/JP2020/025731, with English translation. (4 pages).

International Preliminary Report on Patentability (Form PCT/IB/373) issued in counterpart International application No. PCT/JP2020/025731 mailed Jan. 11, 2022 with Form PCT/ISA/237, with English translation. (10 pages).

* cited by examiner

| | | | | |
|---|---|---|---|---|
| Ti (at%) | 0 | 2.2 | 0 | 2.2 |
| Nb (at%) | 0 | 0 | 0.5 | 0.5 |

| | | | | |
|---|---|---|---|---|
| Ti (at%) | 0 | 2. 2 | 0 | 2. 2 |
| Nb (at%) | 0 | 0 | 0. 5 | 0. 5 |

* WHEN COMPRESSED TO 3.5 $g/cm^3$

| | | | | |
|---|---|---|---|---|
| Ti (at%) | 0 | 1.0 | 0 | 1.0 |
| Nb (at%) | 0 | 0 | 0.5 | 0.5 |

| | | | | |
|---|---|---|---|---|
| Ti (at%) | 0 | 1.0 | 0 | 1.0 |
| Nb (at%) | 0 | 0 | 0.5 | 0.5 |

* WHEN COMPRESSED TO 3.5 g/cm$^3$

| | | | | |
|---|---|---|---|---|
| Ti (at%) | 0 | 1. 0 | 0 | 2. 2 |
| Nb (at%) | 0 | 0 | 0. 5 | 0. 5 |

| | COMPARATIVE EXAMPLE 1C | COMPARATIVE EXAMPLE 2C | COMPARATIVE EXAMPLE 3C | EXAMPLE 1C |
|---|---|---|---|---|
| Ti (at%) | 0 | 1.0 | 0 | 2.2 |
| Nb (at%) | 0 | 0 | 0.5 | 0.5 |

* WHEN COMPRESSED TO 3.5 g/cm$^3$

POSITIVE ELECTRODE ACTIVE MATERIAL FOR LITHIUM ION SECONDARY BATTERY AND LITHIUM ION SECONDARY BATTERY

TECHNICAL FIELD

The present invention relates to a positive electrode active material for a lithium ion secondary battery and a lithium ion secondary battery.

BACKGROUND ART

In recent years, with widespread use of a portable electronic device such as a mobile phone terminal or a notebook personal computer, development of a small and lightweight non-aqueous electrolyte secondary battery having a high energy density and durability has been strongly desired. Furthermore, development of high-output secondary batteries as batteries for electric tools and electric cars including hybrid cars has been strongly desired.

As a secondary battery satisfying such requirement, there is a non-aqueous electrolyte secondary battery such as a lithium ion secondary battery. A lithium ion secondary battery using a lithium-metal composite oxide having a layered or spinel type crystal structure as a positive electrode active material can obtain a high voltage of 4 V-class and therefore has been put into practical use as a battery having a high energy density.

As the lithium-metal composite oxide, lithium-cobalt composite oxide ($LiCoO_2$) that is relatively easily synthesized, lithium-nickel composite oxide ($LiNiO_2$) using nickel that is cheaper than cobalt, lithium-nickel-cobalt-manganese composite oxide ($LiNi_{1/3}Co_{1/3}Mn_{1/3}O_2$), lithium-manganese composite oxide ($LiMn_2O_4$) using manganese, lithium-nickel-manganese composite oxide ($LiNi_{0.5}Mn_{0.5}O_2$), and the like have been proposed.

However, when a non-aqueous electrolyte is used as a battery material of a lithium ion secondary battery, high thermal stability is required. For example, when short circuit occurs inside a lithium ion secondary battery, heat is generated by a rapid current, and therefore higher thermal stability is required.

In this regard, lithium-nickel-cobalt-manganese composite oxide, lithium-nickel composite oxide, or the like that is excellent in thermal stability has recently attracted attention. The lithium-nickel-cobalt-manganese composite oxide is a layered compound as lithium-cobalt composite oxide, lithium-nickel composite oxide, and the like and refers to a ternary system positive electrode active material in which a composition ratio of nickel, cobalt, and manganese at the transition metal site is 1:1:1.

Particularly, in recent years, aiming at capacity enlargement, a ternary system positive electrode active material or a positive electrode active material (Hi-Ni positive electrode material) obtained by increasing a nickel ratio of lithium-nickel composite oxide to have a high nickel ratio has attracted attention. However, since an increase in battery capacity depending on the nickel ratio causes a trade-off with a decrease in thermal stability, a positive electrode active material with high performances as a lithium ion secondary battery (such as high cycle characteristics, a high capacity, and a high output), short circuit resistance, and thermal stability achieved at the same time is required.

There have been proposed some techniques of adding niobium to a lithium-metal composite oxide in order to improve thermal stability. For example, in Patent Literature 1, there has been proposed a positive electrode active material for a non-aqueous secondary battery, which is formed of a composition containing at least one or more compounds that are represented by a general formula: $Li_aNi_{1-x-y-z}Co_xM_yNb_zO_b$ (where M is one or more elements selected from the group consisting of Mn, Fe and Al, $1 \le a \le 1.1$, $0.1 \le x \le 0.3$, $0 \le y \le 0.1$, $0.01 \le z \le 0.05$, and $2 \le b \le 2.2$) and composed of lithium, nickel, cobalt, an element M, niobium, and oxygen. According to Patent Literature 1, a positive electrode active material having high thermal stability and a large discharge capacity is supposed to be obtained since a Li—Nb—O-based compound existing in the vicinity of surfaces of particles or inside the particles has high thermal stability.

Furthermore, in Patent Literature 2, there has been proposed a positive electrode active material for a non-aqueous electrolyte secondary battery, which contains lithium-nickel-manganese composite oxide that is represented by a general formula (1): $Li_dNi_{1-a-b-c}Mn_aM_bNb_cO_{2+\gamma}$ (in General formula (1) above, M is at least one element selected from the group consisting of Co, W, Mo, V, Mg, Ca, Al, Ti, Cr, Zr and Ta, $0.05 \le a \le 0.60$, $0 \le b \le 0.60$, $0.003 \le c \le 0.03$, $0.95 \le d \le 1.20$, and $0 \le \gamma \le 0.5$), in which at least a part of niobium in the lithium-nickel-manganese composite oxide is solid-solved in the primary particles. According to Patent Literature 2, a non-aqueous secondary battery is supposed to be obtained in which both of a high energy density and excellent output characteristics and thermal stability during short circuit attributable to a decrease in conductivity are achieved in a higher level.

CITATION LIST

Patent Literature

Patent Literature 1: JP 2002-151071 A
Patent Literature 2: WO 2018/043669 A
Patent Literature 3: JP 2008-017729 A
Patent Literature 4: JP 4807467 B1
Patent Literature 5: JP 2006-147499 A
Patent Literature 6: JP 2007-265784 A
Patent Literature 7: JP 2008-257902 A

SUMMARY OF INVENTION

Technical Problem

It is described that the positive electrode active materials described in Patent Literatures 1 and 2 above contain niobium in a specific form so as to improve thermal stability, but a further improvement in thermal stability in lithium-nickel composite oxide is required. Furthermore, since niobium is expensive, a positive electrode active material capable of achieving high thermal stability at lower cost is required.

The present invention has been achieved in view of these circumstances. An object of the present invention is to provide a positive electrode active material containing lithium-nickel composite oxide, the positive electrode active material that can higher thermal stability at low cost.

There have been proposed some techniques of adding, for example, titanium to lithium-metal composite oxide in order to obtain a positive electrode active material having high battery characteristics. According to Patent Literatures 3 to 7, a positive electrode active material formed of lithium-nickel-cobalt-titanium composite oxide has favorable thermal stability and a high battery capacity.

Furthermore, when short circuit occurs inside the lithium ion secondary battery, as one of methods of suppressing a rapid increase in current caused by short circuit, for example, as described in Patent Literature 2 above, it is conceivable that decreasing conductivity of the positive electrode active material in a state of existing while compressed to the positive electrode or increasing the volume resistivity is effective.

However, in Patent Literatures 1 to 7 above, there is no description of an effect obtained by containing a combination of niobium and titanium as heterogeneous elements in lithium-nickel composite oxide.

Solution to Problem

According to a first aspect of the present invention, there is provided a positive electrode active material for a lithium ion secondary battery, the positive electrode active material comprising a lithium-nickel composite oxide having a hexagonal layered structure and configured by secondary particles with a plurality of aggregated primary particles, in which the lithium-nickel composite oxide contains lithium (Li), nickel (Ni), manganese (Mn), titanium (Ti), niobium (Nb), and optionally an element M1 that is at least one element selected from the group consisting of Co, V, Mg, Mo, Ca, Cr, Ta, Na, W, Fe, Zn, B, Si, P, Zr, and Al, an amount of substance ratio of the respective elements is represented as Li:Ni:Mn:M:Ti:Nb=a:(1−x1−y1−b−c):x1:y1:b:c (provided that, $0.97 \le a \le 1.25$, $(1-x1-y1-b-c) < 0.80$, $0.03 \le x1 \le 0.35$, $0 \le y1 \le 0.35$, $0.005 \le b \le 0.05$, and $0.001 < c \le 0.03$), and in the amount of substance ratio, $(b+c) \le 0.06$ and $b > c$ are satisfied.

According to a second aspect of the present invention, there is provided a positive electrode active material for a lithium ion secondary battery, the positive electrode active material containing a lithium-nickel composite oxide having a hexagonal layered structure and configured by secondary particles with a plurality of aggregated primary particles, in which the lithium-nickel composite oxide contains lithium (Li), nickel (Ni), manganese (Mn), titanium (Ti), niobium (Nb), and optionally an element M2 that is at least one element selected from the group consisting of Co, V, Mg, Mo, Ca, Cr, Ta, Na, W, Fe, Zn, B, Si, P, Zr, and Al, an amount of substance ratio of the respective elements is represented as Li:Ni:Mn:M 2:Ti:Nb=a:(1−x2−y2−b−c):x2:y2:b:c (provided that, $0.97 \le a \le 1.25$, $0.880 < (1-x2-y2-b-c)$, $0.01 \le x2 \le 0.113$, $0 \le y2 \le 0.103$, $0.005 \le b \le 0.05$, and $0.001 < c \le 0.03$), and in the amount of substance ratio, $(b+c) \le 0.06$ and $b > c$ are satisfied.

According to a third aspect of the present invention, there is provided a positive electrode active material for a lithium ion secondary battery, the positive electrode active material containing a lithium-nickel composite oxide having a hexagonal layered structure and configured by secondary particles with a plurality of aggregated primary particles, in which the lithium-nickel composite oxide contains lithium (Li), nickel (Ni), cobalt (Co), aluminum (Al), titanium (Ti), niobium (Nb), and optionally an element M3 that is at least one element selected from the group consisting of Mn, V, Mg, Mo, Ca, Cr, Ta, Na, W, Fe, Zn, B, Si, P, and Zr, an amount of substance ratio of the respective elements is represented as Li:Ni:Co:Al:M 3:Ti:Nb=a:(1−x3−y3−z3−b−c):x3:y3:z 3:b:c (provided that, $0.97 \le a \le 1.25$, $0.01 \le x3 \le 0.25$, $0.005 \le y3 \le 0.15$, $0 \le z3 \le 0.15$, $0.005 \le b \le 0.05$, $0.001 < c \le 0.03$), and in the amount of substance ratio, $(b+c) \le 0.06$ and $b > c$ are satisfied.

Furthermore, in the first aspect, it is preferable that in the positive electrode active material, a volume resistivity, as determined by powder resistivity measurement, when compressed to 3.5 g/cm$^3$ is preferably $1.0 \times 10^3$ Ω·cm or more and $1.0 \times 10^5$ Ω·cm or less. Furthermore, in the second aspect, it is preferable that in the positive electrode active material, a volume resistivity, as determined by powder resistivity measurement, when compressed to 3.5 g/cm$^3$ is preferably $1.0 \times 10^2$ Ω·cm or more and $1.0 \times 10^5$ Ω·cm or less. Furthermore, in the third aspect, it is preferable that in the positive electrode active material, a volume resistivity, as determined by powder resistivity measurement, when compressed to 3.5 g/cm$^3$ is preferably $5.0 \times 10^2$ Ω·cm or more and $1.0 \times 10^5$ Ω·cm or less.

Furthermore, it is preferable that in the positive electrode active material, a niobium concentration at the grain boundary between primary particles, as determined by point analysis using STEM-EDX, with respect to a niobium concentration inside primary particles of the lithium-nickel composite oxide is 1.3 times or more. Furthermore, it is preferable that a titanium concentration at the grain boundary between primary particles, as determined by point analysis using STEM-EDX, with respect to a titanium concentration inside primary particles of the lithium-nickel composite oxide is less than 1.3 times. Furthermore, it is preferable that [(D90−D10)/Mv] indicating a particle size distribution width calculated by D90, D10 and a volume average particle size (Mv) in a particle size distribution by a laser diffraction scattering method is or more and 1.20 or less. Furthermore, it is preferable that the volume average particle size Mv is 8 μm or more and 20 μm or less. Furthermore, in the above-described amount of substance ratio, "c" indicating the amount of substance ratio of Nb is preferably $0.002 \le c \le 0.03$.

According to a fourth aspect of the present invention, there is provided a lithium ion secondary battery including a positive electrode, a negative electrode, and a non-aqueous electrolyte, the positive electrode containing the above-described positive electrode active material for a lithium ion secondary battery.

Advantageous Effects of Invention

According to the present invention, it is possible to provide a positive electrode active material that can achieve high thermal stability at low cost. Furthermore, the positive electrode active material of the present invention can be easily produced in industrial scale production, and is considered to be extremely industrially valuable.

DESCRIPTION OF EMBODIMENTS

Hereinafter, a positive electrode active material for a lithium ion secondary battery obtained by a production method according to the present embodiment, a method for producing the same, and a lithium ion secondary battery using this positive electrode active material will be described.

1. Positive Electrode Active Material for Lithium Ion Secondary Battery

A positive electrode active material for a lithium ion secondary battery (hereinafter, also referred to as "positive electrode active material") according to the present embodiment contains lithium-nickel composite oxide having a hexagonal layered structure and configured by secondary particles with a plurality of aggregated primary particles. The lithium-nickel composite oxide contains at least lithium (Li), nickel (Ni), titanium (Ti), and niobium (Nb), as elements other than oxygen.

Particularly, when a combustible non-aqueous electrolyte is used as a constituent material of the lithium ion secondary battery, the lithium ion secondary battery is required to have high thermal stability. Furthermore, in a lithium ion secondary battery, when short circuit occurs between a positive electrode and a negative electrode in a charged state, a current rapidly flows to generate large heat. As a result, a chain may occur in which a positive electrode active material is decomposed to further generate heat. Therefore, by using a positive electrode active material having a high volume resistivity under a compressed condition in the positive electrode, it is possible to suppress a rapid increase in current caused by short circuit and to further improve thermal stability during short circuit.

The present inventors have conducted intensive studies, and as a result, have found that by containing specific amounts of titanium (Ti) and niobium (Nb) in a specific distribution in lithium-nickel composite oxide to be used in a positive electrode active material, the positive electrode active material has a high volume resistivity and high thermal stability can be achieved at low cost by suppressing oxygen releasing at the time of overcharge, thereby completing the present invention.

Figure 2:
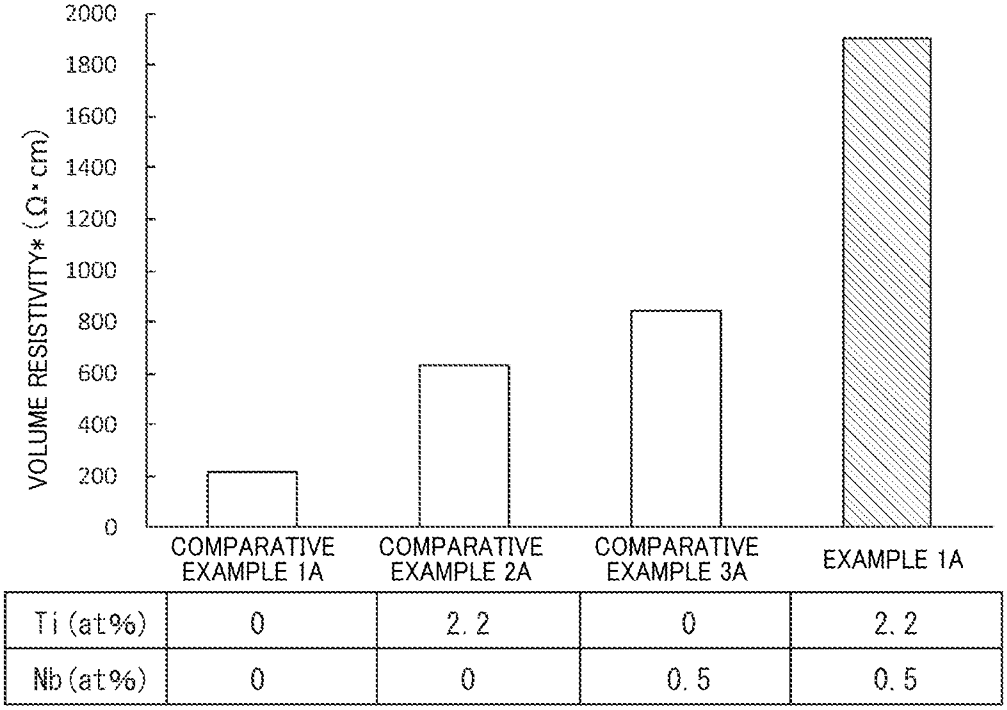
FIG. 2 is a graph showing volume resistivities of positive electrode active materials obtained in Comparative Examples 1A to 3A and Example 1A when compressed.
Figure 3:
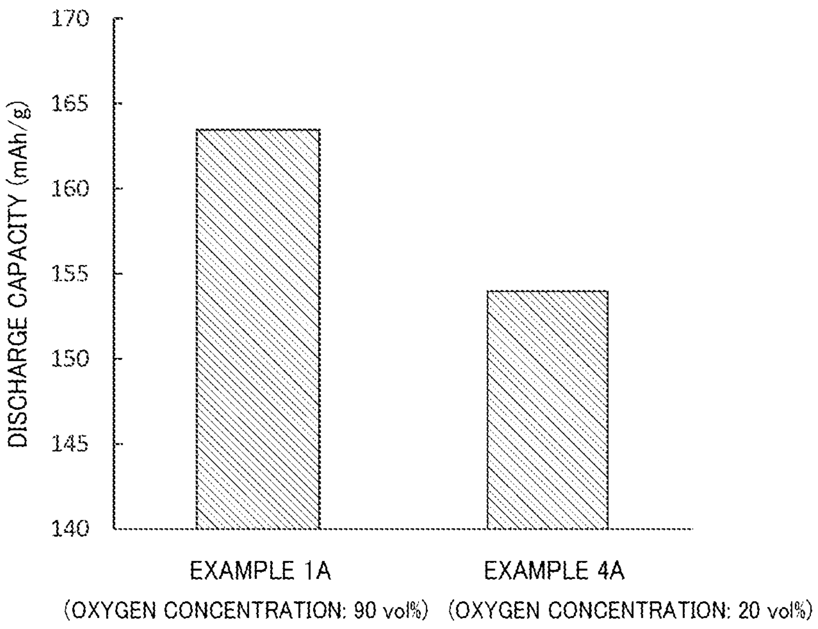
FIG. 3 is a graph showing discharge capacities of positive electrode active materials obtained in Examples 1A and 4A.

Hereinafter, an effect obtained by containing titanium (Ti) and niobium (Nb) in the lithium-nickel composite oxide according to the present embodiment will be described with reference to FIGS. 1 to 3. Note that, FIGS. 1 to 3 are made based on evaluation results of positive electrode active materials and secondary batteries obtained in Examples 1A and 4A and Comparative Examples 1A to 3A to be described below.

Figure 1:
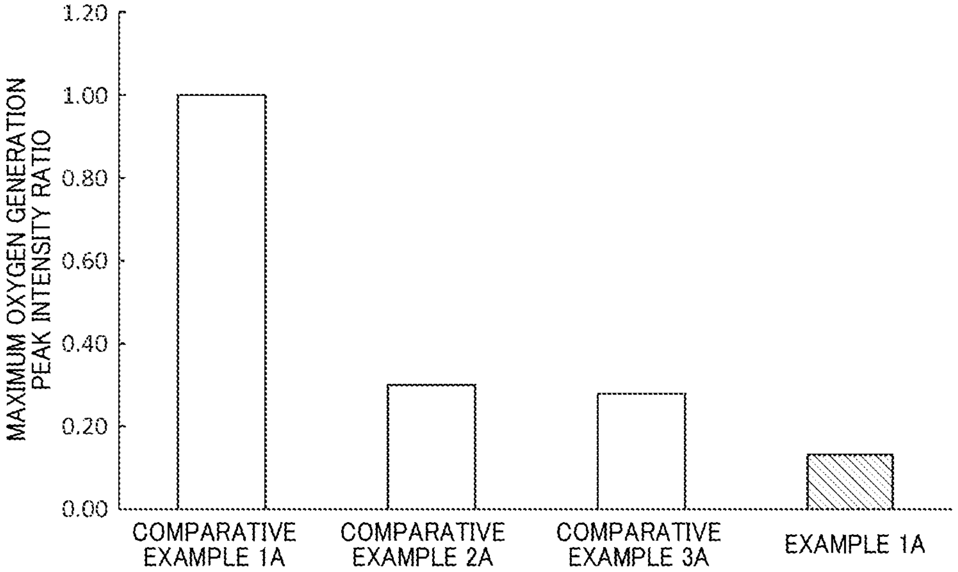
FIG. 1 is a graph showing maximum oxygen generation peak intensity ratios of positive electrode active materials obtained in Comparative Examples 1A to 3A and Example 1A.

FIG. 1 is a graph showing maximum oxygen generation peak intensity ratios (the peak intensity of Comparative Example 1 was regarded as "1") obtained by measuring the amount of oxygen when lithium-nickel composite oxide (positive electrode active material) in an overcharged state is heated from 200° C. to 300° C.

The graph of FIG. 1 shows maximum oxygen generation peak intensity ratios of Comparative Example 1A not containing titanium and niobium, Comparative Example 2A containing titanium alone (Ti: 2.2 atomic %), Comparative Example 3A containing niobium alone (Nb: 0.5 atomic %), and Example 1A containing titanium and niobium (Ti: 2.2 atomic %, Nb: 0.5 atomic %), from the left.

As shown in FIG. 1, as compared with Comparative Example 1A not containing titanium and niobium, the maximum oxygen generation peak intensity ratios of Comparative Example 2A only containing titanium (Ti: 2.2 atomic %) and Comparative Example 3A only containing niobium (Nb: 0.5 atomic %) are decreased. Furthermore, as compared with Comparative Examples 2A and 3A, the maximum oxygen generation peak intensity ratio of Example 1A containing both of titanium and niobium (Ti: 2.2 atomic %, Nb: 0.5 atomic %) is further decreased.

Furthermore, Example 1A contains 0.5 atomic % of Nb along with Ti and shows a higher maximum oxygen generation peak intensity ratio than Comparative Example 3A only containing Nb (Nb: 0.5 atomic %). Therefore, in the positive electrode active material according to the present embodiment, the amount of expensive niobium used that is necessary for suppressing oxygen generation at the time of overcharge can be decreased by containing a combination Ti and Nb.

The graph of FIG. 2 shows a volume resistivity (Ω·cm) when lithium-nickel composite oxide (positive electrode active material) is compressed to 3.5 g/cm$^3$.

As shown in FIG. 2, as compared with Comparative Example 1A not containing titanium and niobium, the volume resistivities of Comparative Example 2A only containing titanium (Ti: 2.2 atomic %) and Comparative Example 3A only containing niobium (Nb: 0.5 atomic %) are increased to some extent. However, as compared with Comparative Examples 2A and 3A, in Example 1A containing both of titanium and niobium (Ti: 2.2 atomic %, Nb: 0.5 atomic %), it is clear that the volume resistivity is extremely increased. Therefore, it was shown that in the positive electrode active material according to the present embodiment, by containing titanium and niobium, the volume resistivity at the time of compression is significantly increased, and thus thermal stability during short circuit is excellent.

Furthermore, the graph of FIG. 3 shows discharge capacities (mAh/g) of Example 1A and Example 4A (Ti: 2.2 atomic %, Nb: 0.5 atomic %) produced under the same conditions, except that the oxygen concentration in an atmosphere in the firing process is changed. As shown in FIG. 3, in Example 1A in which the oxygen concentration when firing was set to 80 vol % or more (oxygen concentration: 90 vol %), the discharge capacity is improved as compared with Example 4A in which the oxygen concentration when firing was set to 20 vol %.

Figure 4:
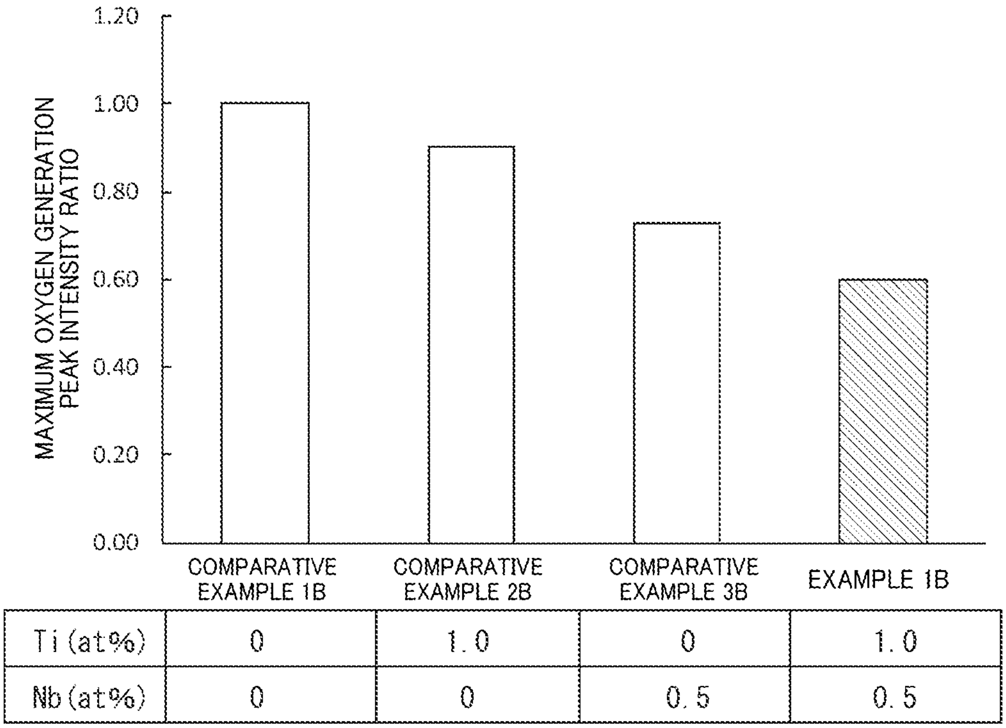
FIG. 4 is a graph showing maximum oxygen generation peak intensity ratios of positive electrode active materials obtained in Comparative Examples 1B to 3B and Example 1B.
Figure 5:
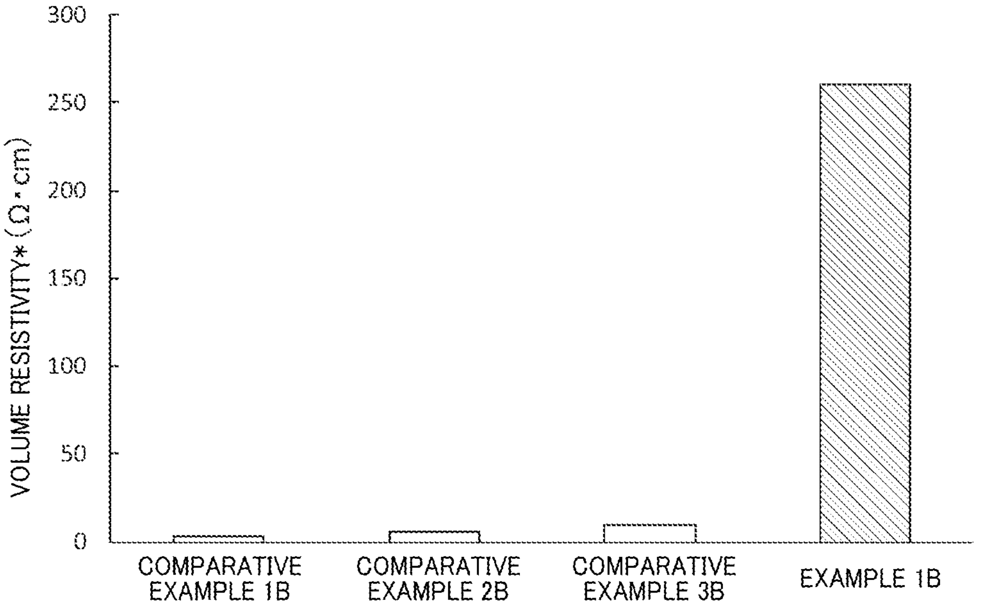
FIG. 5 is a graph showing volume resistivities of positive electrode active materials obtained in Comparative Examples 1B to 3B and Example 1B when compressed.
Figure 6:
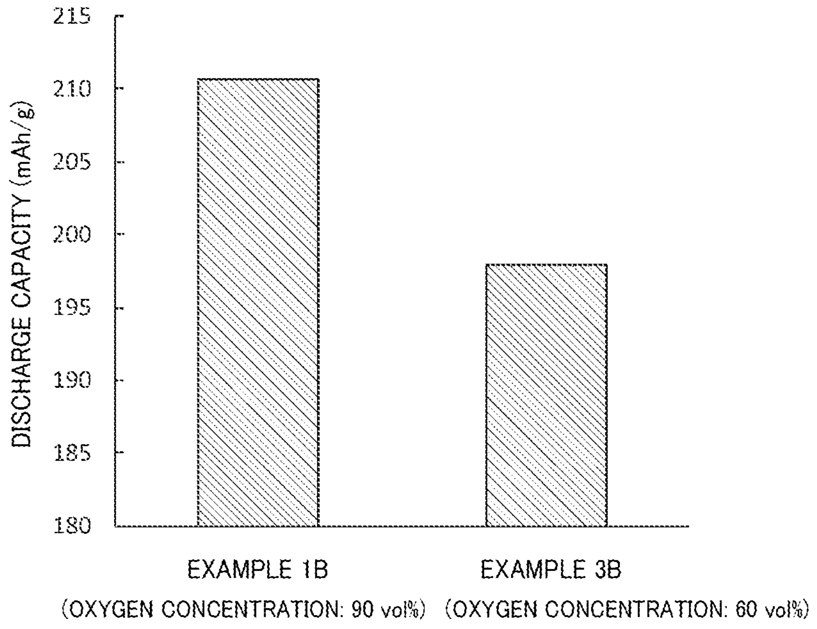
FIG. 6 is a graph showing discharge capacities of positive electrode active materials obtained in Examples 1B and 3B.

Furthermore, the present inventors have confirmed that even when the compositions of lithium-nickel composite oxide are different, the same effect as described above can be obtained (see Examples 1B and 3B, Comparative Examples 1B to 3B, and FIG. 4 to FIG. 6, see Examples 1C and 4C. Comparative Examples 1C to 3C, and FIGS. 7 to 9).

Thus, generally, although it is considered that it is difficult to achieve both a high volume resistivity and a high battery capacity, the positive electrode active material according to the present embodiment can attain a high battery capacity and achieve both high thermal stability and a high battery capacity at low cost by adjusting production conditions (for example, an oxygen concentration at the time of the firing process, and the like) regardless of an extremely high volume resistivity (when compressed to 3.5 g/cm$^3$).

From the above description, it is clear that in the positive electrode active material according to the present embodiment, (i) high thermal stability at the time of overcharge and an extremely high volume resistivity at the time of compression can be realized at low cost and thermal stability during short circuit is excellent by containing a combination of titanium and niobium in lithium-nickel composite oxide, and (ii) both of a high battery capacity and thermal stability during short circuit can be achieved by adjusting production conditions. Hereinafter, a configuration of the positive electrode active material according to the present embodiment will be described in detail.

[Elements Constituting Lithium-Nickel Composite Oxide]

The lithium-nickel composite oxide according to the present embodiment includes lithium-nickel composite oxide containing at least lithium (Li), nickel (Ni), titanium (Ti), and niobium (Nb), as elements other than oxygen.

Furthermore, as a preferred example of the positive electrode active material according to the present embodiment, respective elements constituting the lithium-nickel composite oxide may be represented as the following amount of substance ratios A to C.

[Amount of Substance Ratio A]

The lithium-nickel composite oxide ay contain, for example, lithium (Li), nickel (Ni), manganese (Mn), titanium (Ti), niobium (Nb), and optionally an element M1 that is at least one element selected from the group consisting of Co, V, Mg, Mo, Ca, Cr, Ta, Na, W, Fe, Zn, B, Si, P, Zr, and Al, as elements other than oxygen.

The amount of substance ratio (molar ratio) of the respective elements is preferably represented as Li:Ni:Mn:M1:Ti:Nb=a:(1−x1−y1−b−c):x1:y1:a: b (provided that, $0.97 \le a \le 1.25$, $(1-x1-y1-b-c)<0.80$, $0.03 \le x1 \le 0.35$, $0 \le y1 \le 0.35$, $0.005 \le b \le 0.05$ and $0.001<c \le 0.03$) from the viewpoint of a high battery capacity and thermal stability. Hereinafter, the amount of substance ratio of the respective elements is referred to as the amount of substance ratio A. Furthermore, in the amount of substance ratio A, "b" indicating the amount of substance ratio of titanium (Ti) and "c" indicating the amount of substance ratio of niobium (Nb) satisfy relations of $(b+c) \le 0.06$ and $b>c$. Hereinafter, preferred compositions of the respective elements excluding titanium and niobium will be described. Note that, the amount of substance ratio of titanium and niobium will be described below.

(Lithium)

In the above-described amount of substance ratio A, since the total amount of substance ratio of the elements other than Li is 1, "a" indicating the amount of substance ratio of Li corresponds to the amount of substance ratio of lithium and the element (Me) other than lithium (hereinafter, also referred to as "Li/Me"). Furthermore, the range of "a" is $0.97 \le a \le 1.25$, and preferably $1.00 \le a \le 1.15$. When the value of "a" is in the above range, the reaction resistance of the positive electrode is decreased, and the output of the battery can be improved. Furthermore, the range of "a" may be $1.00 \le a \le 1.05$.

(Manganese)

In the above-described amount of substance ratio A, the range of "x1" indicating the amount of substance ratio of Mn is $0.03 \le x1 \le 0.35$, preferably $0.05 \le x1 \le 0.35$, and more preferably $0.10 \le x1 \le 0.35$. When the value of "x1" is in the above range, a high battery capacity and high thermal stability can be attained. On the other hand, when the value of "x1" is less than 0.03, the thermal stability improving effect is not obtainable. Furthermore, when the value of "x1" exceeds 0.35, the battery capacity is decreased. Furthermore, by containing manganese in the above range, in the firing process (S20) to be described below, the firing temperature can be raised, and the dispersion of titanium or the like can be promoted.

(Element M1)

In the above-described amount of substance ratio A, the element M1 is at least one element selected from the group consisting of Co, V, Mg, Mo, Ca, Cr, Ta, Na, W, Fe, Zn, B, Si, P, Zr, and Al. Furthermore, the range of "y1" indicating the amount of substance ratio of the element M1 is $0 \le y1 \le 0.35$, and preferably $0<y1 \le 0.35$. When "y" is 0 or more, thermal stability, storage characteristics, battery characteristics, and the like can be improved. On the other hand, when the value of "y1" exceeds 0.35, the ratio of Ni is relatively decreased to decrease a battery capacity in some cases. For example, when M1 includes Co, superior battery capacity and output characteristics are attained. In the above-described amount of substance ratio A, when the amount of substance ratio of cobalt included in the element M1 is designated as "y2", the range of "y2" is preferably $0<y2 \le 0.35$, more preferably $0.02 \le y2 \le 0.35$, and more preferably $0.05 \le y2 \le 0.35$.

(Nickel)

In the above-described amount of substance ratio A, (1−x1−b−c) indicating the amount of substance ratio of Ni is $(1-x1-y1-b-c)<0.80$. When the amount of substance ratio of nickel is in the above range, a secondary battery having extremely high thermal stability can be obtained. When the amount of substance ratio of nickel is low, thermal stability tends to increase, but since the lithium-nickel composite oxide according to the present embodiment has the composition as described above, thermal stability is further improved. Thus, a secondary battery having extremely high thermal stability can be obtained.

[Amount of Substance Ratio B]

The lithium-nickel composite oxide ay contain, for example, lithium (Li), nickel (Ni), manganese (Mn), titanium (Ti), niobium (Nb), and optionally an element M2 that is at least one element selected from the group consisting of Co, V, Mg, Mo, Ca, Cr, Ta, Na, W, Fe, Zn, B, Si, P, Zr, and Al, as elements other than oxygen.

The amount of substance ratio (molar ratio) of the elements is preferably represented as Li:Ni:Mn:M2:Ti:Nb=a:(1−x2−y2−b−c):x2:y2:b:c (provided that, $0.95 \le a \le 1.25$, $0.880<(1-x2-y2-b-c)$, $0.01 \le x2 \le 0.113$, $0 \le y2 \le 0.103$, $0.005 \le b \le 0.05$, and $0.001<c \le 0.03$) from the viewpoint of a high battery capacity. Hereinafter, the amount of substance ratio of the respective elements is referred to as the amount of substance ratio B. Furthermore, in the above-described amount of substance ratio B, "z" indicating the amount of substance ratio of titanium (Ti) and "w" indicating the amount of substance ratio of niobium (Nb) satisfy relations of $(b+c) \le 0.06$ and $b>c$. Hereinafter, preferred compositions of the respective elements excluding titanium and niobium will be described. Note that, the amount of substance ratio of titanium and niobium will be described below.

(Lithium)

In the above-described amount of substance ratio, since the total amount of substance ratio of the elements other than Li is 1, "a" indicating the amount of substance ratio of Li corresponds to the amount of substance ratio of lithium and the element (Me) other than lithium (hereinafter, also referred to as "Li/Me"). Furthermore, the range of "a" is $0.97 \le a \le 1.25$, and preferably $1.00 \le a \le 1.15$. When the value of "a" is in the above range, the reaction resistance of the positive electrode is decreased, and the output of the battery can be improved. Furthermore, the range of "a" may be $1.00 \le a \le 1.05$.

(Manganese)

In the above-described amount of substance ratio B, the range of "x2" indicating the amount of substance ratio of Mn is $0.01 \le x2 \le 0.113$, preferably $0.02 \le x2 \le 0.10$, and more preferably $0.03 \le x2 \le 0.10$. When the value of "x2" is in the above range, a high battery capacity and high thermal stability can be attained. On the other hand, when the value of "x2" is less than 0.01, the thermal stability improving effect is not obtainable. Furthermore, when the value of "x2" exceeds 0.113, the battery capacity is decreased. Furthermore, by containing manganese in the above range, in the firing process (S20) to be described below, the firing temperature can be raised, and the dispersion of titanium or the like can be promoted.

(Element M2)

In the above-described amount of substance ratio B, the element M2 is at least one element selected from the group consisting of Co, V, Mg, Mo, Ca, Cr, Ta, Na, W, Fe, Zn, B, Si, P, Zr, and Al. Furthermore, the range of "x2" indicating the amount of substance ratio of the element M2 is $0 \le y2 \le 0.103$, and preferably $0 < y2 \le 0.103$. When "y2" is 0 or more, thermal stability, storage characteristics, battery characteristics, and the like can be improved. On the other hand, when the value of "y2" exceeds 0.103, the ratio of Ni is relatively decreased to decrease a battery capacity in some cases. For example, when M2 includes Co, superior battery capacity and output characteristics are attained. When M is Co, $0 < y2 \le 0.10$ is preferable. Furthermore, when the amount of substance ratio of Co included in the element M2 is designated as "y2'", the amount of substance ratio is preferably $0 < y2' \le 0.01$, and more preferably $0.01 \le y2' \le 0.10$. Furthermore, M may include Al. When the amount of substance ratio of Al included in the element M2 is designated as "y2''", the amount of substance ratio is preferably $0 < y2'' \le 0.10$, and more preferably $0.01 \le y2'' \le 0.10$.

(Nickel)

In the above-described amount of substance ratio B, (1−x2−y2−b−c) indicating the amount of substance ratio of Ni is $0.880 < (1-x2-y2-b-c)$ and preferably $0.880 < (1-x2-y2-b-c) \le 0.950$. When the amount of substance ratio of nickel is in the above range, a secondary battery having a high battery capacity can be obtained. When the amount of substance ratio of nickel is high, a battery capacity is improved, but thermal stability may be decreased. However, the lithium-nickel composite oxide according to the present embodiment has the composition as described above, and thus can have high thermal stability regardless of a high nickel ratio.

[Amount of Substance Ratio C]

The lithium-nickel composite oxide ay contain, for example, lithium (Li), nickel (Ni), cobalt (Co), aluminum (Al), titanium (Ti), niobium (Nb), and optionally an element M3 that is at least one element selected from the group consisting of Mn, V, Mg, Mo, Ca, Cr, Ta, Na, W, Fe, Zn, B, Si, P, and Zr, as elements other than oxygen.

The amount of substance ratio (molar ratio) of the elements is preferably represented as Li:Ni:Co:Al:M 3:Ti:Nb=a:(1−x3−y3−z3−b−c):x3:y3:z 3:b:c (provided that, $0.97 \le a \le 1.25$, $0.01 \le x3 \le 0.25$, $0.005 \le y3 \le 0.15$, $0 \le z3 \le 0.15$, $0.005 \le b \le 0.05$, and $0.001 < c \le 0.03$) from the viewpoint of a high battery capacity. Hereinafter, the amount of substance ratio of the respective elements is referred to as the amount of substance ratio C. Furthermore, in the above-described amount of substance ratio C, "b" indicating the amount of substance ratio of titanium (Ti) and "c" indicating the amount of substance ratio of niobium (Nb) satisfy relations of $(b+c) \le 0.06$ and $b>c$. Hereinafter, preferred compositions of the respective elements excluding titanium and niobium will be described. Note that, the amount of substance ratio of titanium and niobium will be described below.

(Lithium)

In the above-described amount of substance ratio C, since the total amount of substance ratio of the elements other than Li is 1, "a" indicating the amount of substance ratio of Li corresponds to the amount of substance ratio of lithium and the element (Me) other than lithium (hereinafter, also referred to as "Li/Me"). Furthermore, the range of "a" is $0.97 \le a \le 1.25$, and preferably $1.00 \le a \le 1.15$. When the value of "a" is in the above range, the reaction resistance of the positive electrode is decreased, and the output of the battery can be improved. Furthermore, the range of "a" may be $1.00 \le a \le 1.05$.

(Cobalt)

In the above-described amount of substance ratio C, the range of "x3" indicating the amount of substance ratio of Co is $0.01 \le x3 \le 0.25$, preferably $0.03 \le x3 \le 0.20$, and more preferably $0.05 \le x1 \le 0.20$. On the other hand, when the value of "x3" exceeds 0.25, the ratio of Ni is relatively decreased to decrease a battery capacity.

(Aluminum)

In the above-described amount of substance ratio C, the range of "y3" indicating the amount of substance ratio of Al is $0.005 \le y3 \le 0.15$, preferably $0.01 \le y3 \le 0.13$, and more preferably $0.01 \le y3 \le 0.10$. When the value of "y3" is in the above range, cycle characteristics and output characteristics can be improved. On the other hand, when the value of "y3" exceeds 0.15, the ratio of Ni is relatively decreased to decrease a battery capacity.

(Element M3)

In the above-described amount of substance ratio C, the element M3 is at least one element selected from the group consisting of Mn, V, Mg, Mo, Ca, Cr, Ta, Na, W, Fe, Zn, B, Si, P, and Zr. Furthermore, the range of "z3" indicating the amount of substance ratio of the element M3 is $0 \le z3 \le 0.15$, and preferably $0 < z3 \le 0.10$. When "z3" is 0 or more, thermal stability, storage characteristics, battery characteristics, and the like can be improved. On the other hand, when the value of "z3" exceeds 0.15, the ratio of Ni is relatively decreased to decrease a battery capacity in some cases.

(Nickel)

In the above-described amount of substance ratio C, (1−x3−y3−z3−b−c) indicating the amount of substance ratio of Ni is 0.39 (1−x3−y3−z3−b−c), preferably 0.50 (1−x3−y3−z3−b−c), and more preferably 0.70 (1−x3−y3−z3−b−c) ≤0.950. When the amount of substance ratio of nickel is in the above range, a secondary battery having a high battery capacity can be obtained. When the amount of substance ratio of nickel is high, a battery capacity is improved, but thermal stability may be decreased. However, the lithium-nickel composite oxide according to the present embodiment has the composition as described above, and thus can have high thermal stability regardless of a high nickel ratio.

Hereinafter, the amount of substance ratios of titanium (Ti) and niobium (Nb) in the above-described amount of substance ratios A to C and distribution of titanium (Ti) and niobium (Nb) will be described.

(Titanium)

In the above-described amount of substance ratios A to C, the range of "b" indicating the amount of substance ratio of Ti is $0.005 \leq b \leq 0.05$. As described above, when titanium is contained in the above range along with niobium, the volume resistivity when the lithium-nickel composite oxide is compressed can be extremely increased, and oxygen releasing when used in a positive electrode of a secondary battery is suppressed, so that high thermal stability can be obtained. On the other hand, when the value of "b" is less than 0.005, the thermal stability improving effect is not sufficient. Furthermore, when the value of "b" exceeds the percentage of Ni or Mn is relatively decreased, the crystal structure is not stable, and cationic mixing is likely to occur, so that the battery capacity may be greatly decreased.

(Niobium)

In the above-described amount of substance ratios A to C, the range of "c" indicating the amount of substance ratio of Nb is $0.001 < c \leq 0.03$, preferably $0.002 \leq c \leq 0.03$, more preferably $0.002 \leq c \leq 0.02$, and further preferably $0.002 \leq w \leq 0.01$. As described above, by containing niobium in the above range along with titanium, even when a small content of niobium is used, the volume resistivity when the lithium-nickel composite oxide is compressed can be extremely increased, and oxygen releasing when used in a positive electrode of a secondary battery is suppressed, so that high thermal stability can be attained.

Furthermore, regarding the above-described amount of substance ratios A to C, the sum (b+c) of the amount of substance ratio (b) of titanium and the amount of substance ratio (c) of niobium is 0.06 or less, preferably 0.05 or less, and more preferably 0.03 or less. When "b+c" is in the above range, a higher battery capacity can be obtained while high thermal stability is attained.

Furthermore, regarding the above-described amount of substance ratios A to C, the amount of substance ratio (c) of niobium is smaller than the amount of substance ratio (b) of titanium (b>c), $b \geq 2c$ is preferable, $b \geq 3c$ is more preferable, and $b \geq 4c$ is further preferable. Since niobium is a more expensive element than titanium, by decreasing the content of niobium to be smaller than that of titanium, production cost can be reduced, and by combining niobium with titanium, high thermal stability can be attained.

Note that, the composition of the lithium-nickel composite oxide can be measured by quantitative analysis using inductive coupled plasma (ICP) emission spectrometry.

(Distribution of Niobium)

At least a part of niobium (Nb) contained in the lithium-nickel composite oxide according to the present embodiment is preferably segregated to a grain boundary between primary particles. The segregation of niobium can be confirmed, for example, by surface analysis/line analysis of the composition of cross-sections of primary particles to detect the concentration of niobium of at least a part of the grain boundary between primary particles by energy dispersive X-ray spectroscopy (EDX) using a scanning transmission electron microscope (S-TEM). Note that, at least a part of niobium may exist inside primary particles.

Furthermore, the niobium concentration at the grain boundary between primary particles, as determined by STEM-EDX, with respect to the niobium concentration inside primary particles is preferably 1.3 times or more, more preferably 1.4 times or more, and more preferably 1.5 times or more. Note that, the upper limit of the niobium concentration is not particularly limited, and for example, is 5 times or less.

Note that, the concentration of niobium inside primary particles or at the grain boundary can be confirmed by surface analysis/line analysis/point analysis of the composition of cross sections of a plurality of secondary particles by EDX measurement using a scanning transmission electron microscope (S-TEM).

For example, the niobium concentration at a grain boundary between primary particles can be obtained by randomly selecting twenty regions including the grain boundary between primary particles (for example, regions that are regions of 130 nm×130 nm and include the grain boundary so that the grain boundary crosses in the region) from cross-sections of a plurality of secondary particles, confirming the composition of each region by point analysis, and calculating an average value thereof. Furthermore, similarly, the niobium concentration in primary particles can be obtained by randomly selecting twenty regions inside the primary particles (for example, regions of 130 nm×130 nm and not including the grain boundary), analyzing the composition of each region, and calculating an average value thereof.

(Distribution of Titanium)

The distribution of titanium (Ti) contained in the lithium-nickel composite oxide according to the present embodiment is not particularly limited, titanium may exist on at least one of the surface and the grain boundary of primary particles or may be solid-solved inside primary particles. However, from the viewpoint of improving a battery capacity in a secondary battery, titanium is preferably solid-solved. Herein, the state where titanium is solid-solved indicates, for example, a state where titanium is detected inside primary particles by surface analysis of secondary particle cross-section by using EDX with S-TEM and condensation of titanium at the interface of primary particles is not confirmed, and it is preferable that titanium is detected over all cross-sections inside primary particles.

For example, the titanium concentration at the grain boundary between primary particles, as determined by STEM-EDX, with respect to the titanium concentration inside primary particles is preferably less than 1.3 times, preferably 1.2 times or less, and preferably 1.1 times or less, and may be 1.0 time or less. Furthermore, the lower limit of the titanium concentration at the grain boundary between primary particles with respect to the titanium concentration inside primary particles may be 0.6 times or more, may be 0.7 times or more, and for example, may be 0.8 times or more and 1.2 times or less, and may be 0.9 or more and 1.1 times or less. Note that, the titanium concentration can be measured by surface analysis using EDX with S-TEM, similarly to the niobium concentration described above.

Note that, in the lithium-nickel composite oxide according to the present embodiment, the distribution of each element other than niobium (Nb) and titanium (Ti) described above is not particularly limited, and for example, when the lithium-nickel composite oxide contains Ni, Mn, and Co as the element M1 or M2, it is preferable that these metal elements are detected over all cross-sections inside a plurality of primary particles constituting the secondary particles.

[Volume Average Particle Size (Mv)]

The volume average particle size (Mv) of the positive electrode active material according to the present embodiment is preferably 8 μm or more and 20 μm or less, and more preferably 10 μm or more and 18 μm or less. In a case where the volume average particle size (Mv) is in the above range, when the positive electrode active material is used for a positive electrode of a secondary battery, it is possible to achieve both high output characteristics and battery capacity and high filling properties to the positive electrode.

Meanwhile, when the volume average particle size (Mv) is less than 8 μm, high filling properties to the positive electrode cannot be obtained in some cases. Furthermore, when the volume average particle size (Mv) exceeds 20 μm, high output characteristics and battery capacity may not be obtained in some cases. Note that, the volume average particle size (Mv) can be determined from, for example, a volume integrated value measured with a laser light diffraction scattering type particle size distribution analyzer.

[(D90−D10)/Mv] (Particle Size Distribution Width)

The positive electrode active material according to the present embodiment preferably has [(D90−D10)/Mv] of 0.80 or more and 1.20 or less. Note that, [(D90−D10)/Mv] indicates a particle size distribution width of particle sizes of particles constituting the positive electrode active material, the particle size distribution width being calculated by D90 and D10 (particle sizes at 90% and 10% in volume integration of particle amounts in a particle size distribution curve) and a volume average particle size (Mv) in a particle size distribution obtained by a laser light diffraction scattering method.

When the particle size distribution of the particles constituting the positive electrode active material is wide, there are many fine particles each having a particle size smaller than the volume average particle size (Mv) and many coarse particles each having a particle size larger than the average particle size. When the particle size distribution width is in the above range, fine particles and coarse particles are appropriately mixed, a packing density is increased, and an energy density per volume can be increased. Furthermore, from the viewpoint of improving the energy density per volume, [(D90−D10)/Mv] may be 0.90 or more, and may be 0.95 or more.

On the other hand, when the particle size distribution width of the positive electrode active material is less than 0.80, the volume energy density is decreased. Furthermore, when the method for producing a positive electrode active material according to the present embodiment is used, the upper limit is about 1.20. Note that, in the firing process (S20) described below, when the firing temperature exceeds 1000° C., the particle size distribution width may exceed 1.20. In this case, when the positive electrode active material is formed, the specific surface area is decreased to increase the resistance of the positive electrode so that the battery capacity may be decreased.

[Volume Resistivity when Compressed to 3.5 g/Cm$^3$]

The positive electrode active material according to the present embodiment has a higher volume resistivity, as determined by powder resistivity measurement, when compressed to 3.5 g/cm$^3$ than that of the positive electrode active material produced under the same conditions except that titanium and niobium are not added. Generally, a superior active material having a low resistance in the electrochemical reaction as the electroconductivity of the positive electrode active material is high is conceivable, but in the case of taking thermal stability during short circuit into consideration, by making a volume resistivity appropriately high, generation of a rapid increase in current during short circuit can be suppressed. Furthermore, the positive electrode active material according to the present embodiment may have, for example, a higher volume resistivity 5 times or more that of the positive electrode active material produced under the same conditions except that niobium is not added. Note that, the volume resistivity is a value that varies according to the composition of the lithium-nickel composite oxide, and thus preferred range may be different according to the composition.

For example, in the positive electrode active material containing the lithium-nickel composite oxide having the above-described amount of substance ratio A, the volume resistivity, as determined by powder resistivity measurement, when compressed to 3.5 g/cm$^3$ is preferably $1.0\times10^3$ Ω·cm or more and $1.0\times10^5$ Ω·cm or less, more preferably $1.0\times10^3$ Ω·cm or more and $1.0\times10^4$ Ω·cm or less, and more preferably $1.0\times10^3$ Ω·cm or more and $5.0\times10^3$ Ω·cm or less. When the volume resistivity of the above-described positive electrode active material is in the above range, high thermal stability during short circuit can be obtained.

Furthermore, for example, in the positive electrode active material containing the lithium-nickel composite oxide having the above-described amount of substance ratio B, the volume resistivity, as determined by powder resistivity measurement, when compressed to 3.5 g/cm$^3$ is preferably $1.0\times10^2$ Ω·cm or more and $1.0\times10^5$ Ω·cm or less, more preferably $1.0\times10^2$ Ω·cm or more and $1.0\times10^4$ Ω·cm or less, and more preferably $1.0\times10^2$ Ω·cm or more and $5.0\times10^3$ Ω·cm or less. When the volume resistivity of the above-described positive electrode active material is in the above range, high thermal stability during short circuit can be obtained.

Furthermore, for example, in the positive electrode active material containing the lithium-nickel composite oxide having the above-described amount of substance ratio C, the volume resistivity, as determined by powder resistivity measurement, when compressed to 3.5 g/cm$^3$ is preferably $5.0\times10^2$ Ω·cm or more and $1.0\times10^5$ Ω·cm or less, more preferably $5.0\times10^2$ Ω·cm or more and $1.0\times10^4$ Ω·cm or less, and more preferably $5.0\times10^2$ Ω·cm or more and $8.0\times10^3$ Ω·cm or less. When the volume resistivity of the above-described positive electrode active material is in the above range, high thermal stability during short circuit can be obtained.

Note that, the volume resistivity can be determined, for example, by weighing the positive electrode active material within a range of 4.5 g or more and 5.5 g or less, pressure-molding the positive electrode active material into a cylindrical shape having a diameter of 20 mm to 3.5 g/cm$^3$, and then performing measurement in a pressurized state by a resistivity test method using a four-probe method in accordance with JIS K 7194:1994.

[Maximum Oxygen Generation Peak Intensity]

In the positive electrode active material according to the present embodiment, the maximum oxygen generation peak intensity obtained by measuring the oxygen amount when the temperature is raised from 200° C. to 300° C. in an overcharged state is smaller than the peak intensity of the positive electrode active material produced under the same conditions except that titanium and niobium are not added.

For example, in the positive electrode active material containing lithium-nickel composite oxide having the above-described amount of substance ratio A, the maximum oxygen generation peak intensity ratio obtained by measuring the oxygen amount when the temperature is raised from 200° C. to 300° C. in an overcharged state is preferably 0.25 or less and more preferably 0.20 or less. Note that, the maximum oxygen generation peak intensity ratio refers to a peak intensity ratio when the maximum oxygen generation peak intensity of the positive electrode active material produced under the same conditions except that titanium and niobium are not added is regarded as “1”.

Furthermore, for example, in the positive electrode active material containing lithium-nickel composite oxide having the above-described amount of substance ratio B, the maximum oxygen generation peak intensity ratio obtained by measuring the oxygen amount when the temperature is raised from 200° C. to 300° C. in an overcharged state is preferably or less and more preferably 0.65 or less.

Furthermore, for example, in the positive electrode active material containing lithium-nickel composite oxide having the above-described amount of substance ratio C, the maximum oxygen generation peak intensity ratio obtained by measuring the oxygen amount when the temperature is raised from 200° C. to 300° C. in an overcharged state is preferably or less and more preferably 0.40 or less.

The lower limit of the maximum oxygen generation peak intensity ratio at the time of rising the temperature is not particularly limited, and is about 0.01 or more. Note that, the maximum oxygen generation peak intensity ratio can be measured by the method described in Examples. Furthermore, the maximum oxygen generation peak intensity refers to a peak intensity at which oxygen generated at the time of rising the temperature from 200° C. to 300° C. becomes a local and global maximum.

Note that, the lithium-nickel composite oxide according to the present embodiment may contain an element other than the aforementioned elements (Li, Ni, Mn, Co, Al, the elements M1 to M3, Ti, and Nb), and oxygen at a small amount in the range that does not impair the effect of the present invention. Furthermore, as for lithium-nickel composite oxide contained in the positive electrode active material, other than secondary particles, primary particles may be contained alone at a small amount. Furthermore, the positive electrode active material may contain a compound other than the above-described lithium-nickel composite oxide.

Figure 10:
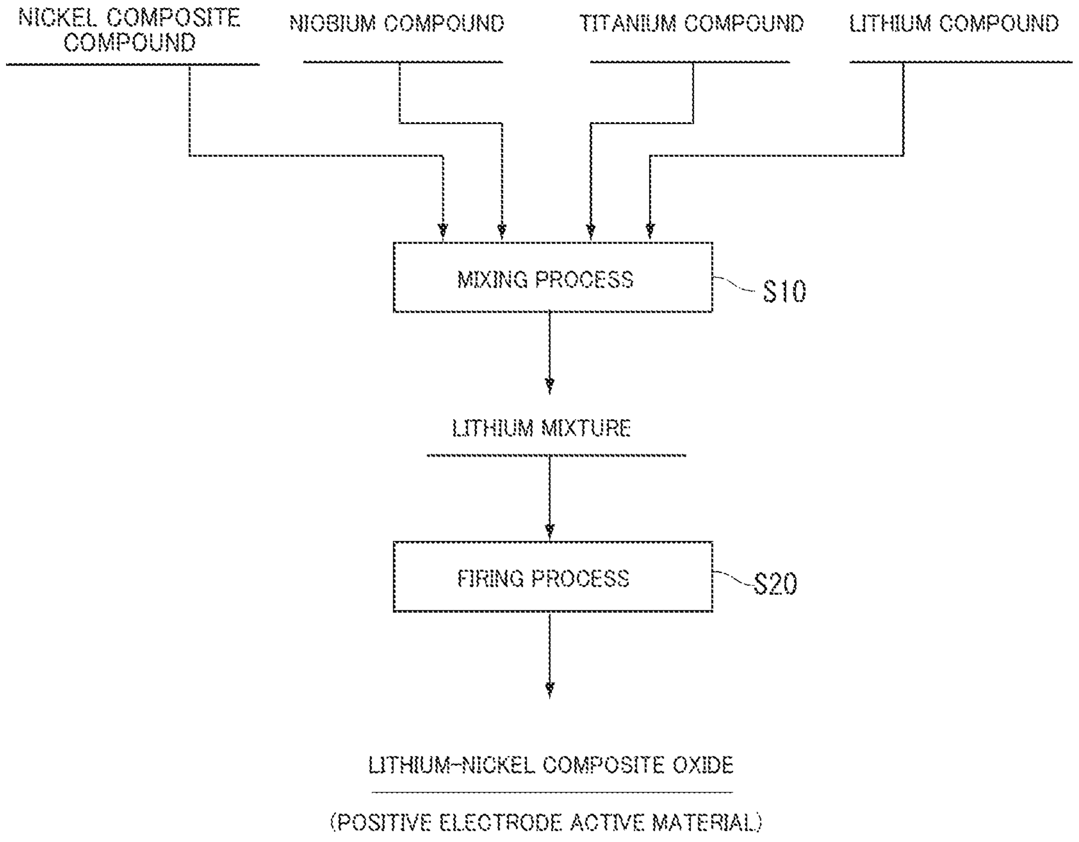
FIG. 10 is a diagram illustrating an example of the method for producing a positive electrode active material according to the present embodiment.

2. Method for Producing Positive Electrode Active Material for Lithium Ion Secondary Battery FIG. 10 is a diagram illustrating an example of a method for producing a positive electrode active material for a lithium ion secondary battery according to the present embodiment (hereinafter, also referred to as “method for producing a positive electrode active material”). By the production method according to the present embodiment, a positive electrode active material containing the above-described lithium-nickel composite oxide can be easily produced on an industrial scale.

As illustrated in FIG. 10, the production method according to the present embodiment may include a mixing process (S10) of mixing at least a nickel composite compound, a titanium compound, a niobium compound, and a lithium compound to obtain a mixture and a firing process (S20) of firing the mixture to obtain the lithium-nickel composite oxide.

Hereinafter, each process will be described in detail. Note that, the following description is an example of the production method according to the present embodiment and does not limit the production method.

[Crystallization Process (S1)]

Figure 11A:
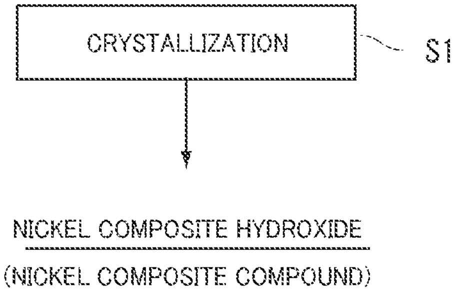
FIG. 11(A) and FIG. 11(B) are diagrams illustrating an example of a method for producing a nickel composite compound according to the present embodiment.
Figure 11B:
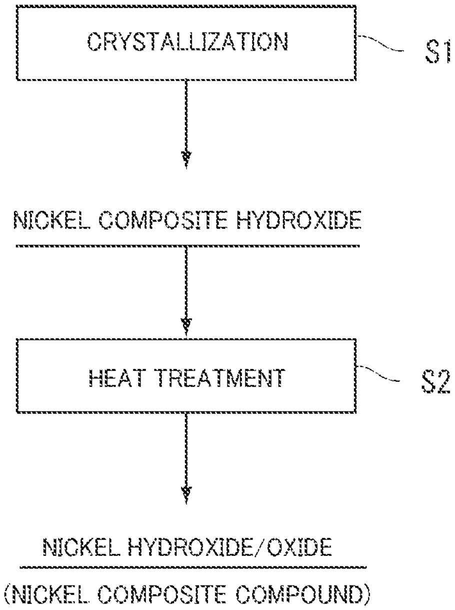

It is preferable that the nickel composite compound to be used in the mixing process (S10) is obtained, for example, as illustrated in FIG. 11(A) and FIG. 11(B), by a method including a crystallization process (S1) and/or a heat treatment process (S2).

The nickel composite hydroxide obtained in the crystallization process (S1) may contain nickel (Ni) and optionally an element M that is at least one element selected from the group consisting of Co, Mn, V, Mg, Mo, Ca, Cr, Ta, Na, W, Fe, Zn, B, Si, P, Zr, and Al (generic term of elements M1, M2, and M3), and elements other than a hydroxyl group (OH). Note that, at least a part of the element M may be added as a solid phase in the mixing process (S10).

For example, when the positive electrode active material containing the lithium-nickel composite oxide having the above-described amount of substance ratio A is produced, it is preferable that the nickel composite hydroxide obtained in the crystallization process (S1) contains nickel (Ni), manganese (Mn), and optionally an element M1 that is at least one element selected from the group consisting of Co, V, Mg, Mo, Ca, Cr, Ta, Na, W, Fe, Zn, B, Si, P, Zr, and Al, as elements other than a hydroxyl group (OH), and the amount of substance ratio of the respective elements is represented as $Ni:Mn:M1=(1-x1-y1):x1:y1$ (provided that, $(1-x1-y1)<0.80$, $0.03\leq x1\leq 0.35$, and $0\leq y1\leq 0.35$). Note that, at least a part of the element M1 may be added as a solid phase in the mixing process (S10).

Furthermore, for example, when the positive electrode active material containing the lithium-nickel composite oxide having the above-described amount of substance ratio B is produced, it is preferable that the nickel composite hydroxide obtained in the crystallization process (S1) contains nickel (Ni), manganese (Mn), and optionally an element M2 that is at least one element selected from the group consisting of Co, V, Mg, Mo, Ca, Cr, Ta, Na, W, Fe, Zn, B, Si, P, Zr, and Al, as elements other than a hydroxyl group (OH), and the amount of substance ratio of the respective elements is represented as $Ni:Mn:M2=(1-x2-y2):x2:y2$ (provided that, $0.88<(1-x2-y2)$, $0.01<x2\leq 0.12$, and $0\leq y2\leq 0.11$). Note that, at least a part of the element M2 may be added as a solid phase in the mixing process (S10).

Furthermore, for example, when the positive electrode active material containing the lithium-nickel composite oxide having the above-described amount of substance ratio C is produced, it is preferable that the nickel composite hydroxide obtained in the crystallization process (S1) contains nickel (Ni), cobalt (Co), aluminum (Al), and optionally an element M3 that is at least one element selected from the group consisting of Mn, V, Mg, Mo, Ca, Cr, Ta, Na, W, Fe, Zn, B, Si, P, and Zr, as elements other than a hydroxyl group (OH), and the amount of substance ratio of the respective elements is represented as $Ni:Co:Al:M3=(1-x3-y3-z3):x3:y3:z3$ (provided that, $0.01\leq x3\leq 0.25$, $0.005\leq y3\leq 0.15$, and $0\leq z3\leq 0.15$)). Note that, at least a part of the element M3 may be added as a solid phase in the mixing process (S10).

The crystallization process (S1) can be performed by a known crystallization method as long as nickel composite hydroxide having the above amount of substance ratio (molar ratio) is obtainable. Hereinafter, an example of the crystallization process (S1) of obtaining a nickel composite hydroxide by crystallization will be described.

For example, while the mixed aqueous solution containing at least nickel and the element M is stirred at a certain speed, a neutralizer is added in a reaction tank to form a reaction aqueous solution, the pH of the reaction aqueous solution is controlled by neutralization, and thus nickel composite hydroxide is generated by coprecipitation.

As the mixed aqueous solution containing nickel and the element M, for example, a sulfate salt solution, nitrate salt solution, chloride solution of nickel and the element M, or the like can be used. Note that, an aqueous solution containing nickel and an aqueous solution containing the element M may be separately prepared and then respectively supplied into a reaction tank, and thus a mixed aqueous solution containing nickel and the element M may be prepared.

The composition of the metal elements contained in the mixed aqueous solution and the composition of the metal elements contained in the nickel composite hydroxide obtained are approximately the same. Hence, the composition of the metal elements in the mixed aqueous solution can be adjusted so as to be the same as the composition of the metal elements in the intended nickel composite hydroxide.

As the neutralizer, an alkaline aqueous solution can be used, and for example, sodium hydroxide, potassium hydroxide, or the like can be used.

Furthermore, a complexing agent may be added to the reaction aqueous solution along with the neutralizer. The complexing agent is not particularly limited as long as it can form a complex by binding with a nickel ion or another metal ion in the reaction aqueous solution in the reaction tank, a known complexing agent can be used, and for example, an ammonium ion supplier can be used. The ammonium ion supplier is not particularly limited, but for example, ammonia, ammonium sulfate, ammonium chloride, ammonium carbonate, or ammonium fluoride can be used. The solubility of the metal ions in the reaction aqueous solution can be adjusted by adding a complexing agent.

In the crystallization process (S1), when a complexing agent is not used, regarding the temperature of the reaction aqueous solution, the temperature (liquid temperature) is preferably set to be in a range of higher than 60° C. and 80° C. or lower and the pH of the reaction aqueous solution at the above temperature is preferably 10 or more and 12 or less (at standard 25° C.). When the pH of the reaction aqueous solution exceeds 12, the nickel composite hydroxide to be obtained becomes fine particles, the filterability deteriorates, and spherical particles may not be obtained. On the other hand, when the pH of the reaction aqueous solution is less than 10, the generation speed of nickel composite hydroxide remarkably decreases, Ni remains in the filtrate, the precipitated Ni amount deviates from the intended composition, and the nickel composite hydroxide having the intended ratio may not be obtained.

Furthermore, when the temperature of the reaction aqueous solution exceeds 60° C., the solubility of Ni increases, and the precipitated Ni amount deviates from the intended composition, and the phenomenon that coprecipitation does not occur can be avoided. On the other hand, when the temperature of the reaction aqueous solution exceeds 80° C., the slurry concentration (reaction aqueous solution concentration) increases due to the great evaporated moisture amount, and the solubility of Ni decreases, crystals such as sodium sulfate are generated in the filtrate, the concentration of impurities increases, and there is the possibility that the charge and discharge capacity of the positive electrode active material decreases.

In the crystallization process (S1), when a complexing agent such as an ammonium ion supplier is used, the temperature of the reaction aqueous solution is preferably 30° C. or higher and 60° C. or lower since the solubility of Ni in the reaction aqueous solution is increased, and the pH of the reaction aqueous solution is preferably 10 or more and 13 or less (at standard 25° C.) and more preferably 12 or more and 13 or less.

Furthermore, the ammonia concentration in the reaction aqueous solution is preferably maintained at a constant value within a range of 3 g/L or more and 25 g/L or less. When the ammonia concentration is less than 3 g/L, the solubility of metal ions cannot be maintained constant, and thus composite hydroxide primary particles having well-regulated shape and particle size may not be formed. Furthermore, since it is easy to form gel-like nuclei, the particle size distribution of nickel composite hydroxide to be obtained is also likely to spread. On the other hand, when the ammonia concentration exceeds 25 g/L, the solubility of metal ions becomes too high, the metal ion content remaining in the reaction aqueous solution increases, and deviation of the composition of nickel composite hydroxide to be obtained is likely to occur. Note that, when the ammonia concentration fluctuates, the solubility of metal ions fluctuates, uniform hydroxide particles are not formed, and it is thus preferable to maintain the ammonia concentration at a constant value. For example, the ammonia concentration is preferably maintained at a desired concentration by setting the width between the upper limit and the lower limit to about 5 g/L.

Furthermore, when the nickel composite hydroxide to be obtained by crystallization contains an element M that is at least one element selected from the group consisting of Co, Mn, V, Mg, Mo, Ca, Cr, Ta, Na, W, Fe, Zn, B, Si, P, Zr, and Al, the method for blending the element M in the nickel composite hydroxide is not particularly limited, and a known method can be used. For example, from the viewpoint of enhancing productivity, a mixed solution containing nickel and an element M may be prepared in advance and then added into a reaction tank, or an aqueous solution containing an element M may be added to an aqueous solution containing nickel in the reaction tank and nickel composite hydroxide containing an element M may be coprecipitated.

As the aqueous solution containing the element M, for example, aqueous solutions containing cobalt sulfate, manganese sulfate, vanadium oxychloride, vanadium oxysulfate, magnesium sulfate, magnesium chloride, molybdenum chloride, calcium chloride, chromium chloride, sodium tantalate, sodium hydroxide, sodium tungstate, tungsten oxide, ferrous sulfate, zinc chloride, zinc sulfate, boric acid, ammonium borate, silicon bromide, phosphoric acid, zirconium sulfate, zirconium nitrate, aluminum sulfate, sodium aluminate, and the like can be used.

Furthermore, from the viewpoint of optimizing the crystallization conditions to facilitate control of the composition ratio, after nickel composite hydroxide is obtained by the crystallization process (S1), a process of coating the obtained nickel composite hydroxide with the element M may be further provided. A method for coating the element M is not particularly limited, and a known method can be used.

An example of the method for coating the element M will be described below. First, the nickel composite hydroxide obtained by crystallization is dispersed in pure water to form a slurry. Next, this slurry is mixed with an aqueous solution containing the element M in an amount corresponding to the intended amount of coverage, and a neutralizer (an acid or alkali) is added dropwise to the mixture to adjust the pH to a predetermined value. As the acid, for example, sulfuric acid, hydrochloric acid, nitric acid, or the like is used. As the alkali, for example, sodium hydroxide, potassium hydroxide, or the like is used. Next, the slurry is mixed for a predetermined time and then the slurry is filtered and dried, thereby a nickel composite hydroxide coated with the element M can be obtained. Note that, examples of other coating methods include a spray drying method in which a solution containing a compound containing the element M is sprayed onto the nickel composite hydroxide and then dried and a method in which the nickel composite hydroxide is impregnated with a solution containing a compound containing the element M.

Note that, the method of blending the element M in nickel composite hydroxide may include one or both of mixing the element M in the mixed aqueous solution and coating the nickel composite hydroxide with the element M, and for example, 1) nickel composite hydroxide obtained by adding an alkaline aqueous solution to a mixed aqueous solution containing nickel (excluding the element M) and subjecting the mixture to crystallization may be coated with the element M or 2) a mixed aqueous solution containing nickel and a part of the element M is prepared, nickel composite hydroxide (containing the element M) is coprecipitated, the coprecipitate is coated with the element M, and the content of M may be adjusted.

Note that, the crystallization process (S1) may use 1) a method by batch-type crystallization (a batch-type crystallization method) or may use 2) a method by continuous crystallization (a continuous crystallization method). For example, in the case of a batch-type crystallization method, the precipitate is collected, filtered, and washed with water after the reaction aqueous solution in the reaction tank has reached a steady state to obtain nickel composite hydroxide. Furthermore, in the case of a continuous crystallization method, a mixed aqueous solution, an alkaline aqueous solution, and in some cases, an aqueous solution containing an ammonium ion supplier are continuously supplied and allowed to overflow the reaction tank to collect the precipitate, and the precipitate is filtered and washed with water to obtain nickel composite hydroxide.

In the method for producing a positive electrode active material according to the present embodiment, from the viewpoint of obtaining a positive electrode active material showing a high volume energy density when used for a secondary battery, it is preferable to use a continuous crystallization method. In the production by continuous crystallization, a positive electrode active material having a high particle size distribution width, a broad particle size distribution width, and a high filling property can be easily obtained. Furthermore, the continuous crystallization method provides higher productivity than a batch-type crystallization method and is suitable for industrial-scale production.

[Heat Treatment Process (S2)]

The nickel composite compound may be obtained by a method further including a heat treatment process (S2) after the crystallization process (S1). The heat treatment process (S2) is a process of removing at least a part of moisture contained in the nickel composite hydroxide by heat treatment. When the heat treatment process (S2) is provided, it is possible to prevent variations in Li/Me in the positive electrode active material obtained in the firing process (step S20) to be described below by removing at least a part of moisture remaining in the nickel composite hydroxide.

In the heat treatment process (S2), it is sufficient that moisture in the nickel composite hydroxide can be removed to the extent that a variation in Li/Me of the positive electrode active material does not occur, but from the viewpoint of further reducing the variation in Li/Me, it is preferable that the nickel composite hydroxide is sufficiently oxidized to be converted into nickel composite oxide. Note that, it is not necessary to convert all of the nickel composite hydroxide into nickel composite oxide.

Furthermore, when the method includes the heat treatment process (S2), at least one of the nickel composite hydroxide and the nickel composite oxide obtained by the heat treatment process (S2) can be used as the nickel composite compound in the mixing process (S10). Furthermore, when the nickel composite hydroxide contains the element M, the heat treatment process (S2) may be performed after the nickel composite hydroxide is coated with a compound containing the element M, or the at least one of the nickel composite hydroxide and the nickel composite oxide obtained by the heat treatment process (S2) may be coated with a compound containing the element M.

The heat treatment may be performed by heating under the condition in which remaining water in the nickel composite hydroxide is removed, and for example, the temperature for the heat treatment is preferably 105° C. or higher and 700° C. or lower. When the nickel composite hydroxide is heated at 105° C. or higher, at least a part of remaining water can be easily removed. Note that, when the temperature for the heat treatment is lower than 105° C., it takes a long time to remove the remaining water, which is not industrially suitable. On the other hand, when the temperature for the heat treatment exceeds 700° C., the particles converted into the nickel composite oxide may be sintered and aggregated. For example, when most of nickel composite hydroxide is converted into nickel composite oxide, the temperature for the heat treatment is preferably 350° C. or higher and 700° C. or lower.

The atmosphere of the heat treatment is not particularly limited, and for example, it is preferable that the heat treatment is performed in an air flow from the viewpoint of easy operation. Furthermore, the time for the heat treatment is not particularly limited and can be set to, for example, 1 hour or longer. When the time for the heat treatment is shorter than 1 hour, remaining water in the particles of nickel composite hydroxide may not be sufficiently removed. Furthermore, the time for the heat treatment is preferably 5 hours or longer and 15 hours or shorter. Furthermore, the equipment to be used for the heat treatment is not particularly limited, is only required to heat the nickel composite hydroxide in an air flow, and for example, a fan drying machine and an electric furnace that does not generate gas can be suitably used.

Note that, in FIG. 3(B), the nickel composite hydroxide after the crystallization process (S1) is subjected to the heat treatment, but the nickel composite hydroxide obtained in a process other than the crystallization process (S1) may be subjected to the heat treatment. Even in this case, by removing at least a part of moisture in the nickel composite hydroxide, the aforementioned effect can be obtained.

[Mixing Process (S10)]

Figure 7:
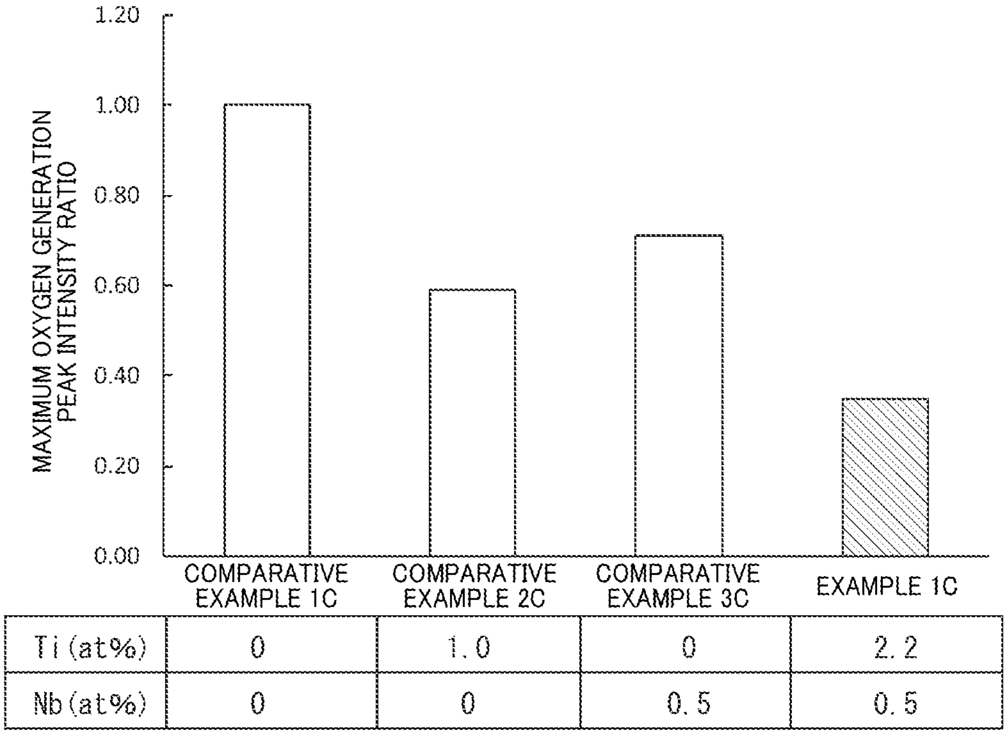
FIG. 7 is a graph showing maximum oxygen generation peak intensity ratios of positive electrode active materials obtained in Comparative Examples 1C to 3C and Example 1C.

As illustrated in FIG. 7, the mixing process (S10) is a process of mixing at least a nickel composite compound, a titanium compound, a niobium compound, and a lithium compound to obtain a mixture. Furthermore, in the mixing process (S10), a compound containing the element M may be mixed other than the above-described compound. In the mixing process (S10), the respective compounds can be added, for example, as powder (solid phase) and mixed. Hereinafter, the respective materials will be described.

(Nickel Composite Compound)

The nickel composite compound to be used in the mixing process (S10) contains nickel (Ni), and optionally an element M that is at least one element selected from the group consisting of Co, Mn, V, Mg, Mo, Ca, Cr, Ta, Na, W, Fe, Zn, B, Si, P, Zr, and Al, as elements other than hydrogen (H) and oxygen (O). Furthermore, the nickel composite compound may be at least one of hydroxide and oxide.

For example, when the positive electrode active material containing the lithium-nickel composite oxide having the above-described amount of substance ratio A is produced, it is preferable that the nickel composite compound contains nickel (Ni), manganese (Mn), and optionally an element M1 that is at least one element selected from the group consisting of Co, V, Mg, Mo, Ca, Cr, Ta, Na, W, Fe, Zn, B, Si, P, Zr, and Al, as elements other than hydrogen (H) and oxygen (O), and the amount of substance ratio of the respective elements is represented as Ni:Mn:M1=(1−x1−y1):x1:y1 (provided that, $(1-x1-y1)<0.80$, $0.03\leq x1\leq 0.35$, and $0\leq y1\leq 0.35$).

Furthermore, for example, when the positive electrode active material containing the lithium-nickel composite oxide having the above-described amount of substance ratio B is produced, it is preferable that the nickel composite compound contains nickel (Ni), manganese (Mn), and optionally an element M2 that is at least one element selected from the group consisting of Co, V, Mg, Mo, Ca, Cr, Ta, Na, W, Fe, Zn, B, Si, P, Zr, and Al, as elements other than hydrogen (H) and oxygen (O), and the amount of substance ratio of the respective elements is represented as Ni:Mn:M2=(1−x2−y2):x2:y2 (provided that, $0.88<(1-x2-y2)$, $0.01<x2\leq 0.12$, and $0\leq y2\leq 0.11$). Note that, at least a part of the element M2 may be added as a solid phase in the mixing process (S10).

Furthermore, for example, when the positive electrode active material containing the lithium-nickel composite oxide having the above-described amount of substance ratio C is produced, it is preferable that the nickel composite compound contains nickel (Ni), cobalt (Co), aluminum (Al), and optionally an element M3 that is at least one element selected from the group consisting of Mn, V, Mg, Mo, Ca, Cr, Ta, Na, W, Fe, Zn, B, Si, P, and Zr, as elements other than hydrogen (H) and oxygen (O), and the amount of substance ratio of the respective elements is represented as Ni:Co:Al:M3=(1−x3−y3−z3):x 3:y3:z3 (provided that, $0.01\leq x3\leq 0.25$, $0.005\leq y3\leq 0.15$, and $0\leq z3\leq 0.15$)).

Since the contents (compositions) of the respective elements (Ni and M) in the nickel composite compound are almost maintained also in particles of the lithium-nickel composite oxide, the content of each of the elements (Ni and M) is preferably in the same range as the content in the lithium-nickel composite oxide described above. Note that, the nickel composite compound to be used in the present embodiment may contain an element other than the aforementioned elements (Ni and M), hydrogen, and oxygen at a small amount in the range that does not impair the effect of the present invention.

As the nickel composite compound, as described above, the nickel composite hydroxide obtained by the crystallization process (S1) may be used, and at least one of the nickel composite hydroxide and the nickel composite oxide obtained by the heat treatment process (S2) may be used. Note that, the nickel composite compound can be obtained by the crystallization process (S1) and/or heat treatment process (S2), but may be obtained by other methods.

Furthermore, it is preferable that, when the nickel composite compound contains manganese as the element M, each of nickel and manganese is uniformly contained in the particles. For example, when mixtures obtained by separately mixing nickel hydroxide particles and a manganese compound, nickel hydroxide particles coated with a manganese compound, and the like are used as raw materials, the distribution of manganese in a positive electrode active material to be obtained becomes non-uniform, and thus an effect obtained by containing manganese may not be sufficiently obtained.

(Titanium Compound)

As the titanium compound, a known compound containing titanium can be used, and for example, titanium oxide, titanium sulfate, titanium tetrabromide, titanium tetrachloride, titanium silicide, or the like can be used. Note that, the titanium compound may be used singly, or two or more kinds thereof may be used.

Among these, titanium oxide is preferable from the viewpoint of easy availability and of avoiding mixing of impurities into the lithium-nickel composite oxide. Note that, when impurities are mixed into the lithium-nickel composite oxide, decreases in thermal stability, battery capacity, and cycle characteristics of the secondary battery obtained may be caused.

The titanium compound is preferably mixed as particles (solid phase). When titanium is added as a solid phase, the particle size of the titanium compound changes the reactivity in the firing process (S20), and thus the particle size of the titanium compound used is one of the important factors. The average particle size of the titanium compound is preferably 0.01 μm or more and 5 μm or less, more preferably 0.05 μm or more and 3 μm or less, and further preferably 0.08 μm or more and 1 μm or less. When the average particle size is smaller than 0.01 μm, problems may arise that it is significantly difficult to handle the powder and the titanium compound scatters and the intended composition cannot be imparted to the active material in the mixing process (S10) and the firing process (S20). On the other hand, when the average particle size is larger than 5 μm, titanium may not be uniformly distributed in the lithium-nickel composite oxide after firing and a battery capacity may be decreased. Note that, the average particle size is a volume average particle size (Mv) and can be determined from, for example, a volume integrated value measured by a laser light diffraction scattering type particle size distribution analyzer.

The titanium compound may be pulverized in advance so as to have a particle size in the above range by using various pulverizers such as ball mill, planetary ball mill, jet mill/nano jet mill, bead mill, and pin mill. Furthermore, the titanium compound may be classified by a dry classifier or sieving as necessary. For example, particles close to 1 μm can be obtained using a dry classifier.

(Niobium Compound)

As the niobium compound, a known compound containing niobium can be used, for example, niobic acid, niobium oxide, niobium nitrate, niobium pentachloride, and niobium nitrate can be used. Among these, the niobium compound is preferably niobium oxide, niobic acid, or a mixture thereof from the viewpoint of easy availability and of avoiding mixing of impurities into the lithium-nickel composite oxide. Note that, when impurities are mixed into the lithium-nickel composite oxide, decreases in thermal stability, battery capacity, and cycle characteristics of the secondary battery obtained may be caused.

The niobium compound is preferably mixed as particles (solid phase). When niobium is added as a solid phase, the particle size of the niobium compound changes the reactivity in the subsequent firing process (step S20), and thus the particle size of the niobium compound used is one of the important factors. The average particle size of the niobium compound is preferably 0.01 μm or more and 20 μm or less, more preferably 0.08 μm or more and 5 μm or less, and further preferably 0.10 μm or more and 3 μm or less. When the average particle size is smaller than 0.01 μm, problems may arise that it is significantly difficult to handle the powder and the niobium compound scatters and the intended composition cannot be imparted to the active material in the mixing process (S10) and the firing process (S20). On the other hand, when the average particle size is larger than 10 μm, Nb may not be uniformly distributed in the lithium-nickel composite oxide after firing and thermal stability may not be secured. Note that, the average particle size is a volume average particle size (Mv) and can be determined from, for example, a volume integrated value measured by a laser light diffraction scattering type particle size distribution analyzer.

The niobium compound may be pulverized in advance so as to have a particle size in the above range by using various pulverizers such as ball mill, planetary ball mill, jet mill/nano jet mill, bead mill, and pin mill. The niobium compound may be classified by a dry classifier or sieving, if necessary. For example, particles having an average particle size close to 0.05 μm can be obtained using a dry classifier.

(Compound Containing Element M)

As the compound containing the element M, a known compound containing the element M can be used, and for example, cobalt oxide, manganese oxide, vanadium pentoxide, magnesium oxide, molybdenum oxide, calcium oxide, calcium carbonate, chromium oxide, tantalum pentoxide, sodium carbonate, tungsten trioxide, iron oxide, zinc oxide, boric acid, boron oxide, silicon oxide, phosphoric acid, zirconium oxide, and the like can be used. Note that, when impurities are mixed into the lithium-nickel composite oxide, decreases in thermal stability, battery capacity, and cycle characteristics of the secondary battery obtained may be caused.

Note that, the element M may be mixed as particles (solid phase) using the compound containing the element M, or may be contained in the nickel composite compound in the aforementioned crystallization process (S1). When the compound containing the element M is added as a solid phase, the particle size of the compound containing the element M changes the reactivity in the subsequent firing process (step S20), and thus it is preferable to appropriately adjust the particle size of the compound containing the element M used. Furthermore, when the compound containing the element M is mixed in the mixing process (S10), the compound containing the element M is preferably mixed so that the total amount of substance of the element M contained in the nickel composite compound and the compound containing the element M is in the amount of substance ratio range of the element M in the lithium-nickel composite compound described above.

The compound containing the element M may be pulverized in advance so as to have a particle size in the above range by using various pulverizers such as ball mill, planetary ball mill, jet mill/nano jet mill, bead mill, and pin mill. The compound containing the element M may be classified by a dry classifier or sieving, if necessary.

(Lithium Compound)

The lithium compound is not particularly limited, and a known compound containing lithium can be used, and for example, lithium carbonate, lithium hydroxide, lithium nitrate, or a mixture thereof is used. Among these, lithium carbonate, lithium hydroxide, or a mixture thereof is preferable from the viewpoint of being less affected by remaining impurities and melting at the firing temperature.

(Mixing Method)

The method for mixing the compound is not particularly limited, and these particles may be sufficiently mixed to the extent to which the shapes of these particles are not destroyed. As the mixing method, for example, mixing can be performed using a general mixer, and for example, mixing can be performed using a shaker mixer, a Loedige mixer, a *Julia* mixer, a V blender, and the like. Note that, it is preferable to sufficiently mix the titanium mixture before the firing process to be described later. When mixing is not sufficiently performed, Li/Me which is the amount of substance ratio (atomic % ratio) of Li to the elements (Me: Me=Ni+the element M+Ti+Nb in the present embodiment) other than Li may vary between the individual particles of the positive electrode active material and problems may arise that sufficient battery characteristics are not attained.

The lithium compound is mixed so that Li/Me in the mixture is 0.97 or more and 1.25 or less. In other words, the lithium compound is mixed so that Li/Me in the mixture is the same as Li/Me in the positive electrode active material obtained. This is because Li/Me in the mixture in this mixing process (S10) becomes Li/Me in the positive electrode active material since Li/Me and the molar ratio of the respective elements do not change before and after the firing process (S20).

Furthermore, in the mixture, the mixing amount of the titanium compound and the niobium compound is adjusted so that the amount of substance ratio (b) of titanium and the amount of substance ratio (c) of niobium to the total amount of substance of the elements excluding lithium satisfy $0.005 \leq b \leq 0.05$, $0.001 < c \leq 0.03$, $(b+c) \leq 0.06$, and $b > c$. Furthermore, the amount of substance ratio (c) of niobium in the mixture may be $0.002 \leq c \leq 0.03$.

Note that, since the contents (ratios) of the niobium (Nb) and titanium (Ti) in the mixture are almost maintained also in the lithium-nickel composite oxide, the content of each of the niobium compound and the titanium compound is preferably in the same range as the content of each of niobium and titanium in the lithium-nickel composite oxide described above.

[Firing Process (S20)]

The firing process (S20) is a process of firing the mixture obtained by the mixing process (S10) to obtain lithium-nickel composite oxide.

When the mixture is fired, lithium in the lithium compound is diffused in the nickel composite compound, and thereby the lithium-nickel composite oxide configured by polycrystal structure particles is formed. The lithium compound melts at a temperature when firing and penetrates into the nickel composite compound to form a lithium-nickel composite oxide. The lithium compound melts at a temperature when firing and penetrates into the nickel composite compound to form a lithium-nickel composite oxide. At this time, it is considered that niobium and titanium contained in the lithium mixture are also penetrate into the inside of the secondary particle along with the melt lithium compound, and also in the primary particles, they penetrate when there is a crystal grain boundary or the like.

The firing atmosphere is preferably an oxidizing atmosphere, the oxygen concentration is more preferably 80 vol % or more and 100 vol % or less, and the oxygen concentration is more preferably 90 vol % or more and 100 vol % or less. In the lithium-nickel composite oxide having a high nickel ratio, so-called cationic mixing in which a transition metal element such as Ni is arranged in the Li site in the layered compound is likely to occur.

Furthermore, the crystallinity of the layered compound is decreased, and the disarrangement of atomic distribution is likely to occur. Due to the disarrangement of these structures, titanium or the like cannot be uniformly solid-solved at the Me site (transition metal element site), and thus it is considered that a battery capacity is decreased. On the other hand, when firing is performed in the above oxygen concentration range, it is possible to obtain a positive electrode active material in which thermal stability is improved while a high battery capacity is maintained and both of a high battery capacity and thermal stability are achieved. Note that, the oxidizing atmosphere refers to an atmosphere containing oxygen that is equal to or higher than in the atmosphere.

For example, when the positive electrode active material containing the lithium-nickel composite oxide having the above-described amount of substance ratio A is produced, the firing temperature in the oxidizing atmosphere is preferably 750° C. or higher and 1100° C. or lower and more preferably 800° C. or higher and 1000° C. or lower. When firing is performed at the above temperature, melting of the lithium compound occurs to promote the penetration and diffusion of titanium. Furthermore, the lithium mixture contains manganese so that the firing temperature can be increased. Furthermore, the crystallinity of the lithium-nickel composite oxide is increased, and thus a battery capacity can be further improved.

Furthermore, for example, when the positive electrode active material containing the lithium-nickel composite oxide having the above-described amount of substance ratio B and amount of substance ratio C is produced, the firing temperature in the oxidizing atmosphere is preferably 750° C. or higher and 1000° C. or lower and more preferably 750° C. or higher and 950° C. or lower. When firing is performed at the above temperature, melting of the lithium compound occurs to promote the penetration and diffusion of titanium. Furthermore, the crystallinity of the lithium-nickel composite oxide is increased, and thus a battery capacity can be further improved.

The firing temperature can be appropriately adjusted within the above range, and by rising the firing temperature, diffusion of titanium and niobium is promoted. Furthermore, when the lithium mixture contains manganese, the firing temperature can be raised.

On the other hand, when the firing temperature is lower than the above range, diffusion of lithium, titanium, and niobium into the nickel composite compound is not sufficiently performed, excessive lithium or unreacted particles may remain or the crystal structure may not be sufficiently arranged, so that a problem arises in that sufficient battery characteristics are not obtained. Furthermore, when the firing temperature exceeds the above range, there is the possibility that sintering violently occurs between the particles of the formed lithium-nickel composite oxide and abnormal grain growth occurs. When abnormal particle growth occurs, the particles may be too coarse after firing so as to decrease a filling property when the positive electrode active material is formed, and further, problems arise in that the reaction resistance due to the disarrangement of the crystal structure is increased and a discharge capacity decreases.

The firing time is set to preferably at least 3 hours or longer and more preferably 6 hours or longer and 24 hours or shorter. When the firing time is shorter than 3 hours, the lithium-nickel composite oxide may not be sufficiently generated. Furthermore, a furnace used for firing is not particularly limited as long as a titanium mixture can be fired in an oxygen flow, an electric furnace without gas generation is preferably used, and either of a batch-type furnace or a continuous furnace can be used.

[Calcination]

Note that, the firing process (S20) may further include a process of performing calcination at a temperature lower than the firing temperature before firing at a temperature of the above range. The calcination is preferably performed at a temperature at which the lithium compound in the mixture may be melt and may react with the nickel composite compound. The temperature for calcination can be set, for example, to 350° C. or higher, and can be set to a temperature lower than the firing temperature. Furthermore, the lower limit of the temperature for calcination is preferably 400° C. or higher. When the mixture is held (calcined) in the above temperature range, the lithium compound penetrates in the nickel composite compound, the diffusion of lithium is sufficiently performed, and thus a uniform lithium-nickel composite oxide can be obtained. For example, when lithium hydroxide is used as the lithium compound, it is preferable to perform calcination while holding the lithium-titanium mixture at a temperature of 400° C. or higher and 550° C. or lower for 1 hour or longer and about 10 hours.

[Crushing]

Note that, in the lithium-nickel composite oxide obtained after the firing process (S20), sintering between particles is suppressed but coarse particles may be formed by weak sintering and aggregation. In such a case, the particle size distribution can be adjusted by eliminating the sintering and aggregation by crushing.

3. Lithium Ion Secondary Battery

The lithium ion secondary battery (hereinafter, also referred to as "secondary battery") according to the present embodiment includes a positive electrode containing the positive electrode active material described above, a negative electrode, and a non-aqueous electrolyte. The secondary battery includes, for example, a positive electrode, a negative electrode, and a non-aqueous electrolyte solution. Furthermore, the secondary battery may include, for example, a positive electrode, a negative electrode, and a solid electrolyte. Furthermore, the secondary battery may be any secondary battery which is charged and discharged by de-insertion and insertion of lithium ions and may be, for example, a non-aqueous electrolyte solution secondary battery or an all-solid-state lithium secondary battery. Note that, the embodiment described below is merely an example, and the secondary battery according to the present embodiment can also be applied to forms subjected to various modifications and improvements based on the embodiment described here.

[Positive Electrode]

A positive electrode of a secondary battery is prepared using the positive electrode active material described above. An example of a method for producing the positive electrode will be described below.

First, the above positive electrode active material, a conductive material, and a binding agent are mixed, activated carbon and a solvent for viscosity adjustment or the like are further added as necessary, and the resulting mixture is kneaded to prepare a positive electrode mixture paste. At this time, a mixing ratio among the components of the positive electrode mixture paste can be appropriately adjusted according to performance of an intended secondary battery. For example, when the solid content of the positive electrode mixture excluding a solvent is regarded as 100 parts by mass, the content of the positive electrode active material may be 60 parts by mass or more and 95 parts by mass or less, the content of the conductive material may be 1 part by mass or more and 20 parts by mass or less, and the content of the binding agent may be 1 part by mass or more and 20 parts by mass or less.

The obtained positive electrode mixture paste is applied to, for example, a surface of an aluminum foil current collector and dried to scatter the solvent, and a sheet-like positive electrode is thereby prepared. Pressurization may be performed by roll press or the like in order to increase an electrode density as necessary. The sheet-like positive electrode thus obtained can be cut into a proper size according to an intended battery and used in preparation of a battery. However, a method for preparing the positive electrode is not limited to the above-exemplified method, and other methods may be used.

As the conductive material, for example, graphite (natural graphite, artificial graphite, expanded graphite, and the like), and a carbon black-based material such as acetylene black or ketjen black can be used.

The binding agent (binder) plays a role of connecting active material particles together, and for example, polyvinylidene fluoride (PVDF), polytetrafluoroethylene (PTFE), fluororubber, ethylene propylene diene rubber, styrene butadiene, a cellulose-based resin, polyacrylic acid, and the like can be used.

A solvent which disperses the positive electrode active material, the conductive material, and the activated carbon and dissolves the binding agent is added to the positive electrode mixture as necessary. As the solvent, specifically, an organic solvent such as N-methyl-2-pyrrolidone can be used. Furthermore, the activated carbon can be added to the positive electrode mixture in order to increase electric double layer capacity.

[Negative Electrode]

As the negative electrode, metal lithium, a lithium alloy, and the like may be used. Furthermore, as the negative electrode, a negative electrode may be used which is formed by mixing a binding agent with a negative electrode active material which can insert and de-insert lithium ions, adding an appropriate solvent thereto to form a paste-like negative electrode mixture, coating a surface of a metal foil current collector such as copper with the paste-like negative electrode mixture, drying the coated metal foil current collector, and compressing the resultant metal foil current collector in order to increase an electrode density as necessary.

Examples of the negative electrode active material include natural graphite, artificial graphite, a fired organic compound such as a phenol resin, and a powdery carbon material such as coke. In this case, as a negative electrode binding agent, a fluorine-containing resin such as PVDF can be used as in the positive electrode, and as a solvent for dispersing the active material and the binding agent, an organic solvent such as N-methyl-2-pyrrolidone can be used.

[Separator]

A separator is disposed by being interposed between the positive electrode and the negative electrode. The separator separates the positive electrode and the negative electrode from each other and retains the electrolyte, a known separator can be used, and for example, a thin film such as polyethylene or polypropylene having a large number of minute pores can be used.

[Non-Aqueous Electrolyte]

As the non-aqueous electrolyte, for example, a non-aqueous electrolyte solution can be used. The non-aqueous electrolyte solution is obtained by dissolving a lithium salt as a supporting salt in an organic solvent. Furthermore, as the non-aqueous electrolyte solution, a solution obtained by dissolving a lithium salt in an ionic liquid may be used. Note that, the ionic liquid refers to a salt including a cation other than a lithium ion and an anion, and being in a liquid state even at room temperature.

As the organic solvent, one selected from the group consisting of cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, further, ether compounds such as tetrahydrofuran, 2-methyltetrahydrofuran, and dimethoxyethane, sulfur compounds such as ethyl methyl sulfone and butane sultone, and phosphorus compounds such as triethyl phosphate and trioctyl phosphate can be used singly, or two or more of these can be used in mixture.

As the supporting salt, $LiPF_6$, $LiBF_4$, $LiClO_4$, $LiAsF_6$, $LiN(CF_3SO_2)_2$, a composite salt thereof, and the like can be used. Further, the non-aqueous electrolyte solution may contain a radical scavenger, a surfactant, a flame retardant, and the like.

Furthermore, as the non-aqueous electrolyte, a solid electrolyte may be used. The solid electrolyte has a property capable of withstanding a high voltage. Examples of the solid electrolyte include an inorganic solid electrolyte and an organic solid electrolyte.

Examples of the inorganic solid electrolyte include an oxide-based solid electrolyte and a sulfide solid electrolyte.

The oxide-based solid electrolyte is not particularly limited, and for example, one that contains oxygen (O) and exhibits lithium ion conductivity and electron insulating property can be suitably used. As the oxide-based solid electrolyte, for example, one or more selected from the group consisting of lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—ZnO, $Li_{1+X}Al_XTi_{2-X}(PO_4)_3$ ($0 \leq X \leq 1$), $Li_{1+X}Al_XGe_{2-X}(PO_4)_3$ ($0 \leq X \leq 1$), $LiTi_2(PO_4)_3$, $Li_{3X}La_{2/3-X}TiO_3$ ($0 \leq X \leq 2/3$), $Li_5La_3Ta_2O_{12}$, $Li_7La_3Zr_2O_{12}$, $Li_6BaLa_2Ta_2O_{12}$, and $Li_{3.6}Si_{0.6}P_{0.4}O_4$ can be used.

The sulfide solid electrolyte is not particularly limited, and for example, one that contains sulfur (S) and exhibits lithium ion conductivity and electron insulating property can be suitably used. As the sulfide solid electrolyte, for example, one or more selected from the group consisting of $Li_2S$—$P_2S_5$, $Li_2S$—$SiS_2$, LiI—$Li_2S$—$SiS_2$, LiI—$Li_2S$—$P_2S_5$, LiI—$Li_2S$—$B_2S_3$, $Li_3PO_4$—$Li_2S$—$Si_2S$, $Li_3PO_4$—$Li_2S$—$SiS_2$, $LiPO_4$—$Li_2S$—SiS, LiI—$Li_2S$—$P_2O_5$, and LiI—$Li_3PO_4$—$P_2S_5$ can be used.

Note that, as the inorganic solid electrolyte, an inorganic solid electrolyte other than those described above may be used, and for example, $Li_3N$, LiI, $Li_3N$—LiI—LiOH, and the like may be used. The organic solid electrolyte is not particularly limited as long as it is a polymer compound exhibiting ionic conductivity, and for example, polyethylene oxide, polypropylene oxide, and copolymers of these can be used. Furthermore, the organic solid electrolyte may contain a supporting salt (lithium salt).

Note that, it is also possible to constitute a secondary battery by using a solid electrolyte instead of the non-aqueous electrolyte solution. The solid electrolyte is not decomposed even at a high potential, therefore does not cause gas generation or thermal runaway due to decomposition of the electrolyte solution at the time of charge, as observed in a non-aqueous electrolyte solution, and thus exhibits high thermal stability. For this reason, when the positive electrode active material according to the present invention is used for a lithium ion secondary battery, a secondary battery exhibiting higher thermal stability can be obtained.

[Shape and Configuration of Secondary Battery]

The configuration of the secondary battery is not particularly limited, and as described above, the secondary battery may include a positive electrode, a negative electrode, a separator, a non-aqueous electrolyte, and the like, or may include a positive electrode, a negative electrode, a solid electrolyte, and the like. Furthermore, the shape of the secondary battery is not particularly limited, and the secondary battery can be formed into various shapes such as a cylindrical shape and a laminated shape.

For example, when the secondary battery is a non-aqueous electrolyte solution secondary battery, a positive electrode and a negative electrode are laminated with a separator interposed therebetween to form an electrode body, the obtained electrode body is impregnated with a non-aqueous electrolyte solution, a positive electrode collector is connected to a positive electrode terminal communicating with the outside using a current collecting lead or the like, a negative electrode collector is connected to a negative electrode terminal communicating with the outside using a current collecting lead or the like, and the resulting product is sealed in a battery case to complete the secondary battery.

Note that, the secondary battery according to the present embodiment is not limited to a form in which a non-aqueous electrolyte solution is used as a non-aqueous electrolyte but can be formed into, for example, a secondary battery using a solid non-aqueous electrolyte, that is, an all-solid-state battery. When the secondary battery according to the present embodiment is formed into the all-solid-state battery, the components other than the positive electrode active material can be changed as necessary.

The secondary battery according to the present embodiment can achieve high thermal stability at low cost. Furthermore, the positive electrode active material to be used for the secondary battery can be obtained by the industrial production method as described above. Furthermore, the secondary battery is suitable for a power source of a small portable electronic device (such as a notebook personal computer or a mobile phone terminal) that is required to have a high capacity all the time. Furthermore, the secondary battery is superior not only in capacity but also in durability and thermal stability at the time of overcharge to a battery fabricated using a conventional positive electrode active material of a lithium-cobalt-based oxide or lithium-nickel-based oxide. Hence, the secondary battery is suitably used as a power source for electric cars that are restricted in a mounting space since miniaturization and capacity enlargement thereof are possible. Note that, the secondary battery can be used not only as a power source for an electric car driven purely by electric energy but also as a power source for a so-called hybrid car used together with a combustion engine such as a gasoline engine or a diesel engine.

EXAMPLES

Hereinafter, the present invention will be described in more detail with reference to Examples and Comparative Examples of the present invention, but the present invention is not limited to these Examples at all. Note that, various evaluation methods used in Examples and Comparative Examples are as follows.

(1) Analysis of composition: Measured by ICP emission spectrometry.

(2) Volume average particle size (Mv) and particle size distribution width [(D90−D10)/average volume particle size]: Performed on a volume basis by a laser diffraction scattering type particle size analyzer (Microtrac HRA manufactured by Nikkiso Co., Ltd.).

(3) Concentration of each element

The positive electrode active material was manufactured so that cross section analysis of primary particles by S-TEM was possible. Twenty primary particles were arbitrarily selected from a plurality of secondary particles contained in the positive electrode active material, and the compositions in a region (130 nm×130 nm) including cross sections and grain boundaries of individual primary particles were subjected to point analysis by EDX of S-TEM.

(4) Volume resistivity: 5 g of a positive electrode active material was pressure-molded into a cylindrical shape having a diameter of 20 mm so as to be 3.5 g/cm$^3$, and then the volume resistivity was measured and determined in a pressurized state by a resistivity test method using a four-probe method in accordance with JIS K 7194: 1994.

Figure 12:
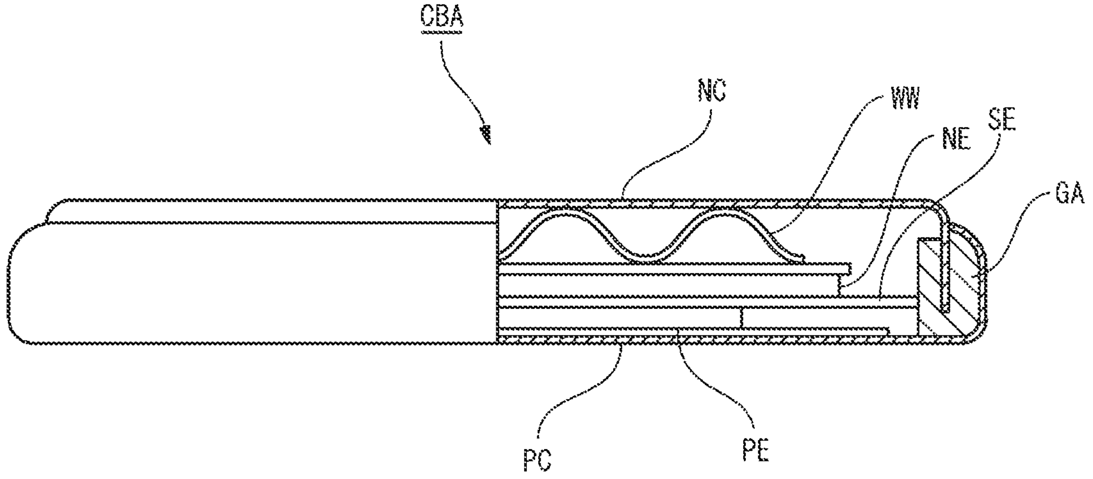
FIG. 12 is a schematic cross-sectional view of a coin-type battery used for battery evaluation.

(5) Initial discharge capacity:

With regard to the initial charge capacity and the initial discharge capacity, a coin-type battery CBA illustrated in FIG. 12 was produced by the following method and then left to stand for about 24 hours to stabilize the open circuit voltage (OCV), then the battery was charged to a cutoff voltage of 4.3 V at a current density of 0.1 mA/cm 2 with respect to the positive electrode to take the capacity at this time as the initial charge capacity, the battery paused for one hour and was then discharged to a cutoff voltage of 3.0 V, and the capacity at this time was taken as initial discharge capacity. A multi-channel voltage/current generator (R6741A manufactured by Advantest Corporation) was used to measure the discharge capacity.

(Production of Coin-Type Battery CBA)

52.5 mg of the positive electrode active material thus obtained, 15 mg of acetylene black, and 7.5 mg of polytetrafluoroethylene resin (PTFE) were mixed and press-molded so as to have a diameter of 11 mm and a thickness of 100 μm at a pressure of 100 MPa, thereby producing a positive electrode PE (electrode for evaluation). The manufactured positive electrode PE was dried in a vacuum dryer at 120° C. for 12 hours. Thereafter, using this positive electrode PE, a 2032 type coin-type battery CBA was manufactured in a glove box in an Ar atmosphere with a dew point controlled at −80° C. As a negative electrode NE, lithium (Li) metal having a diameter of 17 mm and a thickness of 1 mm was used. As an electrolyte solution, an equal volume mixed solution (manufactured by Toyama Pharmaceutical Co., Ltd.) of ethylene carbonate (EC) and diethyl carbonate (DEC) containing 1 M $LiClO_4$ as a supporting electrolyte was used. As the separator SE, a polyethylene porous film having a thickness of 25 μm was used. Furthermore, the coin-type battery CBA was assembled into a coin-type battery by disposing a gasket GA and a wave washer WW and using a positive electrode can PC and a negative electrode can NC.

(6) Maximum oxygen generation peak intensity

The thermal stability of the positive electrode was evaluated by quantitatively determining the amount of oxygen released when the positive electrode active material in an overcharged state was heated. A coin-type battery was produced in a similar manner to (5) and subjected to CC charge (constant current-constant voltage charge) at a 0.05 C rate up to a cutoff voltage of 4.3 V. Thereafter, the coin-type battery was disassembled, only the positive electrode was carefully taken out so as not to cause a short circuit, washed with dimethyl carbonate (DMC), and dried. About 2 mg of the dried positive electrode was weighed and heated from room temperature to 450° C. at a temperature rising rate of 10° C./min using a gas chromatograph mass spectrometer (GCMS, QP-2010plus manufactured by SHIMADZU CORPORATION). Helium was used as the carrier gas. The generation behaviors of oxygen (m/z=32) generated when heating were measured to obtain the maximum oxygen generation peak intensity. Note that, the maximum oxygen peak intensity ratios of Tables 2 and 4 each indicate relative values when the peak intensities of Comparative Example 1A, Comparative Example 1B, and Comparative Example 1C are regarded as "1" (basis) in the generation behavior of oxygen when heating at 200° C. to 300° C.

Examples 1A to 4A and Comparative Examples 1A to 3A

Hereinafter, characteristics of the positive electrode active material containing lithium-nickel composite oxide satisfying the above amount of substance ratio A will be described with reference to Examples 1A to 4A and Comparative Examples 1A to 3A.

Example 1A

[Crystallization Process]

A predetermined amount of pure water was put into the reaction tank (60 L), and the temperature inside the tank was set to 45° C. while stirring the water. At this time, $N_2$ gas was allowed to flow into the reaction tank so that the dissolved oxygen concentration in the reaction tank liquid was 0.8 mg/L. A 2.0 M mixed aqueous solution of nickel sulfate, manganese sulfate, and cobalt sulfate so that the molar ratio among nickel:manganese:cobalt was 55:25:20, a 25% by mass sodium hydroxide solution as an alkaline solution, and 25% by mass of ammonia water as a complexing agent were continuously added into this reaction tank at the same time, and crystallization by a continuous crystallization method was performed.

At the time, the flow rate was controlled so that the residence time of the mixed aqueous solution was 8 hours, the pH in the reaction tank was adjusted to 11.2 to 12.0, and the ammonia concentration was adjusted to 10 to 14 g/L. After the reaction tank was stabilized, a slurry containing nickel-manganese-cobalt composite hydroxide was collected through the overflow port and filtered to obtain a cake of nickel-manganese-cobalt composite hydroxide. Impurities were washed by allowing 1 L of pure water to pass through 140 g of nickel-manganese-cobalt composite hydroxide in the Denver used for filtration. The filtered powder was dried to obtain particles of nickel-manganese-cobalt composite hydroxide in which an amount of substance ratio of nickel, manganese, and cobalt is represented as Ni:Mn:Co=0.55:0.25:0.20.

[Mixing Process]

The obtained particles of nickel-manganese-cobalt composite hydroxide, lithium hydroxide, titanium oxide ($TiO_2$), and niobic acid ($Nb_2O_5 \cdot 4H_2O$) were weighed so that the amount of substance ratio of lithium:(nickel+manganese+cobalt):titanium:niobium was 1.02:0.973:0.022:0.005, and then thoroughly mixed together using a shaker mixer device (TURBULA Type T2C manufactured by Willy A. Bachofen (WAB) AG) to obtain a lithium mixture.

[Firing Process]

The obtained lithium mixture was fired at 980° C. for 8 hours in an oxygen (oxygen concentration: 90% by volume) flow, and then was crushed to obtain particles of lithium-nickel-manganese-cobalt composite oxide (positive electrode active material).

[Evaluation]

The production conditions of the positive electrode active material is presented in Table 1 and evaluation results of the positive electrode active material thus obtained are presented in Table 2.

Example 2A

A positive electrode active material was obtained and evaluated in a similar manner to Example 1A, except that in the mixing process, the obtained particles of nickel-manganese-cobalt composite hydroxide, lithium hydroxide, titanium oxide ($TiO_2$), niobic acid ($Nb_2O_5 \cdot 4H_2O$), and magnesium oxide (MgO) were weighed so that the amount of substance ratio of lithium:(nickel+manganese+cobalt):titanium:niobium:magnesium was 1.02:0.970:0.022:0.005:0.003. The production conditions and evaluation results of the positive electrode active material are presented in Tables 1 and 2.

Example 3A

A positive electrode active material was obtained and evaluated in a similar manner to Example 1A, except that in the mixing process, the obtained particles of nickel-manganese-cobalt composite hydroxide, lithium hydroxide, titanium oxide ($TiO_2$), niobic acid ($Nb_2O_5 \cdot 4H_2O$), and zirconium oxide ($ZrO_2$) were weighed so that the amount of substance ratio of lithium:(nickel+manganese+cobalt):titanium:niobium:zirconium was 1.02:0.970:0.022:0.005:0.003. The production conditions and evaluation results of the positive electrode active material are presented in Tables 1 and 2.

Example 4A

A positive electrode active material was obtained and evaluated in a similar manner to Example 1A, except that in the firing process, firing was performed in an oxygen (oxygen concentration: 20% by volume) flow. The production conditions and evaluation results of the positive electrode active material are presented in Tables 1 and 2.

Comparative Example 1A

A positive electrode active material was obtained and evaluated in a similar manner to Example 1A, except that in the mixing process, a titanium compound and a niobium compound were not mixed, the obtained particles of nickel-manganese-cobalt composite hydroxide and lithium hydroxide were weighed so that the amount of substance ratio of lithium:nickel:manganese:cobalt was 1.02:0.554:0.247:0.199, and in the firing process, the firing temperature was set to 930° C. and the retention time was set to 5 hours. The production conditions and evaluation results of the positive electrode active material are presented in Tables 1 and 2.

Comparative Example 2A

A positive electrode active material was obtained and evaluated in a similar manner to Example 1A, except that in the mixing process, a niobium compound was not mixed, the obtained particles of nickel-manganese-cobalt composite hydroxide, lithium hydroxide, and titanium oxide ($TiO_2$)

were weighed so that the amount of substance ratio of lithium:(nickel+manganese+cobalt):titanium was 1.02:0.978:0.022, and in the firing process, the firing temperature was set to 960° C. and the retention time was set to 5 hours. The production conditions and evaluation results of the positive electrode active material are presented in Tables 1 and 2.

Comparative Example 3A

A positive electrode active material was obtained and evaluated in a similar manner to Example 1A, except that in the mixing process, a titanium compound was not mixed, the obtained particles of nickel-manganese-cobalt composite hydroxide, lithium hydroxide, and niobic acid ($Nb_2O_5 \cdot 4H_2O$) were weighed so that the amount of substance ratio of lithium:(nickel+manganese+cobalt):niobium was 1.02:0.995:0.005, and in the firing process, the firing temperature was set to 980° C. and the retention time was set to 5 hours. The production conditions and evaluation results of the positive electrode active material are presented in Tables 1 and 2.

TABLE 1

| | Mixing process | | Firing process | |
|---|---|---|---|---|
| | Titanium compound — | Niobium compound — | Oxygen concentration vol. % | Firing temperature ° C. |
| Example 1A | $TiO_2$ | $Nb_2O_5 \cdot 4H_2O$ | 90 | 980 |
| Example 2A | $TiO_2$ | $Nb_2O_5 \cdot 4H_2O$ | 90 | 980 |
| Example 3A | $TiO_2$ | $Nb_2O_5 \cdot 4H_2O$ | 90 | 980 |
| Example 4A | $TiO_2$ | $Nb_2O_5 \cdot 4H_2O$ | 20 | 980 |
| Comparative Example 1A | — | — | 90 | 930 |
| Comparative Example 2A | $TiO_2$ | — | 90 | 960 |
| Comparative Example 3A | — | $Nb_2O_5 \cdot 4H_2O$ | 90 | 980 |

TABLE 2

| | Positive electrode active material | | | | | | | |
|---|---|---|---|---|---|---|---|---|
| | Amount of substance ratio | | | | | | | |
| | Li a | Ni — | Mn x1 | Co(M) y1 | Zr(M) y1 | Mg(M) y1 | Ti b | Nb c |
| Example 1A | 1.02 | 0.538 | 0.240 | 0.195 | — | — | 0.022 | 0.005 |
| Example 2A | 1.02 | 0.535 | 0.240 | 0.195 | — | 0.003 | 0.022 | 0.005 |
| Example 3A | 1.02 | 0.535 | 0.240 | 0.195 | 0.003 | — | 0.022 | 0.005 |
| Example 4A | 1.02 | 0.540 | 0.238 | 0.195 | — | — | 0.022 | 0.005 |
| Comparative Example 1A | 1.02 | 0.554 | 0.247 | 0.199 | — | — | — | — |
| Comparative Example 2A | 1.02 | 0.542 | 0.241 | 0.195 | — | — | 0.022 | — |
| Comparative Example 3A | 1.02 | 0.551 | 0.246 | 0.198 | — | — | — | 0.005 |

| | Positive electrode active material | | | | | | Evaluation |
|---|---|---|---|---|---|---|---|
| | Ti/Nb amount of substance ratio — | Grain boundary/intra-particle Nb concentration — | Volume average particle size MV µm | Particle size distribution width — | Volume resistivity* Ω · cm | Discharge capacity mAh/g | Maximum oxygen generation peak intensity ratio** — |
| Example 1A | 4.4 | 1.7 | 16.7 | 0.87 | $1.9 \times 10^3$ | 163 | 0.13 |
| Example 2A | 4.4 | 1.5 | 16.4 | 0.85 | $1.5 \times 10^3$ | 164 | 0.15 |
| Example 3A | 4.4 | 1.6 | 16.9 | 0.88 | $1.2 \times 10^3$ | 162 | 0.16 |
| Example 4A | 4.4 | 1.7 | 17.3 | 0.94 | $1.6 \times 10^3$ | 154 | 0.11 |
| Comparative Example 1A | — | — | 13.0 | 0.84 | $2.2 \times 10^2$ | 177 | 1 |
| Comparative Example 2A | — | — | 14.0 | 0.81 | $6.3 \times 10^2$ | 170 | 0.3 |
| Comparative Example 3A | 0 | 1.3 | 15.5 | 0.84 | $8.4 \times 10^2$ | 171 | 0.28 |

*When compressed at 3.5 g/cm$^3$

**Peak intensity ratios at 200° C. to 300° C., when Comparative Example 1 is regarded as Ref.

[Evaluation Result 1]

As shown in Tables 1 and 2 and FIGS. 1 and 2, the positive electrode active materials obtained in Examples had a volume resistivity at the time of compression of $1.0\times10^3$ Ω·cm or more and a maximum oxygen generation peak intensity ratio of 0.25 or less. Therefore, it is clear that the positive electrode active materials obtained in Examples have high thermal stability and oxygen releasing at the time of overcharge is suppressed.

Furthermore, as shown in Tables 1 and 2 and FIG. 3, in Examples 1A to 3A in which firing was performed in an atmosphere having an oxygen concentration of 90 vol %, a positive electrode active material having a high discharge capacity of 160 mAh/g or more, high thermal stability, and a high battery capacity was obtained.

Further, as presented in Table 2, in positive electrode active materials obtained in Examples, the niobium concentration at the grain boundary between primary particles to the niobium concentration inside primary particles (grain boundary niobium concentration/intraparticle niobium concentration) was 1.3 times or more, and niobium was segregated to a grain boundary between primary particles. Furthermore, the segregation of titanium at the grain boundary between primary particles was not recognized, the titanium concentration at the grain boundary between primary particles with respect to the titanium concentration inside primary particles (titanium concentration at the grain boundary/titanium concentration in particles) was 0.8 times or more and 1.1 or less.

On the other hand, since the positive electrode active material of Comparative Example 1A did not contain titanium and niobium, the volume resistivity when compressed and the maximum oxygen generation peak intensity ratio was low, and thermal stability was not sufficient.

Furthermore, since the positive electrode active materials of Comparative Examples 2A and 3A contain only one of titanium and niobium, the volume resistivity at the time of compression are slightly higher than those of Comparative Example 1 but are lower than Examples, and it cannot be said that thermal stability during short circuit is sufficient. Furthermore, the maximum oxygen generation peak intensity ratio was higher in the positive electrode active material of Comparative Example 3 only containing niobium (Nb: 0.005) than the positive electrode active material of Example 1 (Nb: 0.005). Therefore, in order to obtain the same degree of the effect as in Examples by containing niobium alone, a large amount of niobium is necessary, which is problematic in terms of cost.

Examples 1B to 3B and Comparative Examples 1B to 3B

Hereinafter, characteristics of the positive electrode active material containing lithium-nickel composite oxide satisfying the above amount of substance ratio B will be described with reference to Examples 1B to 3B and Comparative Examples 1B to 3B.

Example 1B

[Crystallization Process]

A predetermined amount of pure water was put into the reaction tank (60 L), and the temperature inside the tank was set to 49° C. while stirring the water. At this time, $N_2$ gas was allowed to flow into the reaction tank so that the dissolved oxygen concentration in the reaction tank liquid was 0.8 mg/L. A 2.0 M mixed aqueous solution of nickel sulfate, manganese sulfate, and cobalt sulfate so that the molar ratio among nickel:manganese:cobalt was 90:5:5, a 25% by mass sodium hydroxide solution as an alkaline solution, and 25% by mass of ammonia water as a complexing agent were continuously added into this reaction tank at the same time, and crystallization by a continuous crystallization method was performed.

At the time, the flow rate was controlled so that the residence time of the mixed aqueous solution was 8 hours, the pH in the reaction tank was adjusted to 11.6 to 12.4, and the ammonia concentration was adjusted to 10 to 14 g/L. After the reaction tank was stabilized, a slurry containing nickel-manganese-cobalt composite hydroxide was collected through the overflow port and filtered to obtain a cake of nickel-manganese-cobalt composite hydroxide. Impurities were washed by allowing 1 L of pure water to pass through 140 g of nickel-manganese-cobalt composite hydroxide in the Denver used for filtration. The filtered powder was dried to obtain particles of nickel-manganese-cobalt composite hydroxide in which an amount of substance ratio of nickel, manganese, and cobalt is represented as Ni:Mn:Co=0.90:0.05:0.05.

[Mixing Process]

The obtained particles of nickel-manganese-cobalt composite hydroxide, lithium hydroxide, titanium oxide ($TiO_2$), niobic acid ($Nb_2O_5 \cdot 4H_2O$), and zirconium oxide ($ZrO_2$) were weighed so that the amount of substance ratio of lithium:(nickel+manganese+cobalt):titanium: niobium:zirconium was 1.02:0.982:0.010:0.005:0.003, and then thoroughly mixed together using a shaker mixer device (TURBULA Type T2C manufactured by Willy A. Bachofen (WAB) AG) to obtain a lithium mixture.

[Firing Process]

The obtained lithium mixture was held and fired at 840° C. for 10 hours in an oxygen (oxygen concentration: 90% by volume) flow, and then was crushed to obtain particles of lithium-nickel-manganese-cobalt composite oxide (positive electrode active material).

[Evaluation]

The production conditions of the positive electrode active material is presented in Table 1 and evaluation results of the positive electrode active material thus obtained are presented in Table 2.

Example 2B

A positive electrode active material was obtained and evaluated in a similar manner to Example 1B, except that in the mixing process, the obtained particles of nickel-manganese-cobalt composite hydroxide, lithium hydroxide, titanium oxide ($TiO_2$), niobic acid ($Nb_2O_5 \cdot 4H_2O$), and magnesium oxide (MgO) were weighed so that the amount of substance ratio of lithium:(nickel+manganese+cobalt):titanium:niobium:magnesium was 1.02:0.982:0.010:0.005:0.003. The production conditions and evaluation results of the positive electrode active material are presented in Tables 1 and 2.

Example 3B

A positive electrode active material was obtained and evaluated in a similar manner to Example 1B, except that in the firing process, firing was performed in an oxygen (oxygen concentration: 60% by volume) flow. The production conditions and evaluation results of the positive electrode active material are presented in Tables 1 and 2.

Comparative Example 1B

A positive electrode active material was obtained and evaluated in a similar manner to Example B, except that in the mixing process, a titanium compound and a niobium compound were not mixed, the obtained particles of nickel-manganese-cobalt composite hydroxide, lithium hydroxide, and zirconium oxide ($ZrO_2$) were weighed so that the amount of substance ratio of lithium:nickel:manganese:cobalt:zirconium was 1.02:0.895:0.050:0.052:0.003, and the firing temperature in the firing process was set to 780° C. The production conditions and evaluation results of the positive electrode active material are presented in Tables 1 and 2.

Comparative Example 2B

A positive electrode active material was obtained and evaluated in a similar manner to Example 1B, except that in the mixing process, a niobium compound was not mixed, the obtained particles of nickel-manganese-cobalt composite hydroxide, lithium hydroxide, titanium oxide ($TiO_2$), and zirconium oxide ($ZrO_2$) were weighed so that the amount of substance ratio of lithium:(nickel+manganese+cobalt):titanium:zirconium was 1.01:0.987:0.010:0.003, and the firing temperature in the firing process was set to 790° C. The production conditions and evaluation results of the positive electrode active material are presented in Tables 1 and 2.

Comparative Example 3B

A positive electrode active material was obtained and evaluated in a similar manner to Example 1B, except that in the mixing process, a titanium compound was not mixed, the obtained particles of nickel-manganese-cobalt composite hydroxide, lithium hydroxide, niobic acid ($Nb_2O_5 \cdot 4H_2O$), and zirconium oxide ($ZrO_2$) were weighed so that the amount of substance ratio of lithium:(nickel+manganese+cobalt):niobium:zirconium was 1.02:0.992:0.005:0.003, and the firing temperature in the firing process was set to 830° C. The production conditions and evaluation results of the positive electrode active material are presented in Tables 1 and 2.

TABLE 3

| | Mixing process | | Firing process | |
|---|---|---|---|---|
| | Titanium compound — | Niobium compound — | Oxygen concentration vol. % | Firing temperature ° C. |
| Example 1B | $TiO_2$ | $Nb_2O_5 \cdot 4H_2O$ | 90 | 840 |
| Example 2B | $TiO_2$ | $Nb_2O_5 \cdot 4H_2O$ | 90 | 840 |
| Example 3B | $TiO_2$ | $Nb_2O_5 \cdot 4H_2O$ | 60 | 840 |
| Comparative Example 1B | — | — | 90 | 780 |
| Comparative Example 2B | $TiO_2$ | — | 90 | 790 |
| Comparative Example 3B | — | $Nb_2O_5 \cdot 4H_2O$ | 90 | 830 |

TABLE 4

| | Positive electrode active material | | | | | | | |
|---|---|---|---|---|---|---|---|---|
| | Amount of substance ratio | | | | | | | |
| | Li a | Ni — | Mn x2 | Co(M) y2 | Zr(M) y2 | Mg(M) y2 | Ti b | Nb c |
| Example 1B | 1.02 | 0.882 | 0.049 | 0.051 | 0.003 | — | 0.010 | 0.005 |
| Example 2B | 1.02 | 0.882 | 0.049 | 0.051 | — | 0.003 | 0.010 | 0.005 |
| Example 3B | 1.02 | 0.882 | 0.049 | 0.051 | 0.003 | — | 0.010 | 0.005 |
| Comparative Example 1B | 1.02 | 0.895 | 0.050 | 0.052 | 0.003 | — | — | — |
| Comparative Example 2B | 1.01 | 0.886 | 0.050 | 0.051 | 0.003 | — | 0.010 | — |
| Comparative Example 3B | 1.02 | 0.890 | 0.050 | 0.052 | 0.003 | — | — | 0.005 |

| | Positive electrode active material | | | | | | Evaluation |
|---|---|---|---|---|---|---|---|
| | Ti/Nb amount of substance ratio — | Grain boundary/intra-particle Nb concentration — | Volume average particle size MV μm | Particle size distribution width — | Volume resistivity* Ω · cm | Discharge capacity mAh/g | Maximum oxygen generation peak intensity ratio** — |
| Example 1B | 2.0 | 1.4 | 16.8 | 1.02 | $2.6 \times 10^2$ | 211 | 0.60 |
| Example 2B | 2.0 | 1.4 | 16.7 | 1.00 | $3.5 \times 10^2$ | 210 | 0.63 |
| Example 3B | 2.0 | 1.4 | 17.2 | 1.04 | $3.2 \times 10^2$ | 198 | 0.55 |
| Comparative Example 1B | — | — | 13.8 | 0.95 | $2.8 \times 10^1$ | 222 | 1.00 |

TABLE 4-continued

| | | | | | | | |
|---|---|---|---|---|---|---|---|
| Comparative Example 2B | — | — | 15.2 | 1.01 | $5.5 \times 10^1$ | 216 | 0.90 |
| Comparative Example 3B | 0 | 1.3 | 15.5 | 0.95 | $9.1 \times 10^1$ | 218 | 0.73 |

*When compressed at 3.5 g/cm$^3$

**Peak intensity ratios at 200 to 300° C. (relative value based on Comparative Example 1)

(Evaluation Result 2)

Furthermore, as shown in Tables 3 and 4 and FIG. 6, in Examples 1 and 2 in which firing was performed in an atmosphere having an oxygen concentration of 90 vol %, a positive electrode active material having an extremely high discharge capacity of 210 mAh/g or more, high thermal stability, and an extremely high battery capacity was obtained.

As shown in Tables 3 and 4 and FIGS. 4 and 5, it is clear that the positive electrode active materials obtained in Examples have a volume resistivity when compressed of $1.0 \times 10^2$ Ω·cm or more and a maximum oxygen generation peak intensity ratio of 0.70 or less, high thermal stability is attained, and oxygen releasing at the time of overcharge is suppressed. Hereinafter, results of these Examples will be described with reference to FIGS. 4 to 6.

The graph of FIG. 4 shows maximum oxygen generation peak intensity ratios of Comparative Example 1B not containing titanium and niobium, Comparative Example 2B containing titanium alone (Ti: 1.0 atomic %), Comparative Example 3B containing niobium alone (Nb: 0.5 atomic %), and Example 1B containing titanium and niobium (Ti: 1.0 atomic %, Nb: 0.5 atomic %), from the left.

As shown in FIG. 4, as compared with Comparative Example 1B not added with titanium and niobium, the maximum oxygen generation peak intensity ratios of Comparative Example 2B only containing titanium (Ti: 1.0 atomic %) and Comparative Example 3B only containing niobium (Nb: 0.5 atomic %) are decreased. Furthermore, as compared with Comparative Examples 2B and 3B, the maximum oxygen generation peak intensity ratio of Example 1B containing both of titanium and niobium (Ti: 1.0 atomic %, Nb: 0.5 atomic %) is further decreased.

Note that, Example 1B contains 0.5 atomic % of Nb along with Ti and shows a higher maximum oxygen generation peak intensity ratio than Comparative Example 3B only containing Nb (Nb: 0.5 atomic %). Therefore, in the positive electrode active material according to the present embodiment, the amount of expensive niobium used that is necessary for suppressing oxygen generation at the time of overcharge can be decreased by containing a combination Ti and Nb.

FIG. 5 is a graph showing a volume resistivity (Ω·cm) when lithium-nickel composite oxide (positive electrode active material) is compressed to 3.5 g/cm$^3$.

As shown in FIG. 5, as compared with Comparative Example 1B not added with titanium and niobium, the volume resistivities of Comparative Example 2B only containing titanium (Ti: 1.0 atomic %) and Comparative Example 3B only containing niobium (Nb: 0.5 atomic %) are increased to some extent. However, as compared with Comparative Examples 2B and 3B, in Example 1B containing both of titanium and niobium (Ti: 1.0 atomic %, Nb: 0.5 atomic %), it is clear that the volume resistivity is extremely increased. Therefore, it was shown that in the positive electrode active material according to the present embodiment, by containing titanium and niobium, the volume resistivity at the time of compression is significantly increased, and thus thermal stability during short circuit is excellent.

Furthermore, FIG. 6 is a graph showing discharge capacities (mAh/g) of Example 1B and Example 3B (Ti: 1.0 atomic %, Nb: 0.5 atomic %) produced under the same conditions, except that the oxygen concentration in an atmosphere in the firing process is changed. As shown in FIG. 6, in Example 1B in which the oxygen concentration when firing was set to 80 vol % or more (oxygen concentration: 90 vol %), the discharge capacity is improved as compared with Example 3B in which the oxygen concentration when firing was set to 60 vol %.

Further, as presented in Table 4, in positive electrode active materials obtained in Examples, the niobium concentration at the grain boundary between primary particles to the niobium concentration inside primary particles (grain boundary niobium concentration/intraparticle niobium concentration) was 1.3 times or more, and niobium was segregated to a grain boundary between primary particles. Furthermore, the segregation of titanium at the grain boundary between primary particles was not recognized, the titanium concentration at the grain boundary between primary particles with respect to the titanium concentration inside primary particles (titanium concentration at the grain boundary/titanium concentration in particles) was 0.8 times or more and 1.1 times or less.

On the other hand, since the positive electrode active material of Comparative Example 1B did not contain titanium and niobium, the volume resistivity when compressed and the maximum oxygen generation peak intensity ratio was low, and thermal stability was not sufficient.

Furthermore, since the positive electrode active materials of Comparative Examples 2B and 3B contain only one of titanium and niobium, the volume resistivity at the time of compression are slightly higher than those of Comparative Example 1B but are lower than Examples, and it cannot be said that thermal stability during short circuit is sufficient. Furthermore, the maximum oxygen generation peak intensity ratio was higher in the positive electrode active material of Comparative Example 3B only containing niobium (Nb: 0.005) than the positive electrode active material of Example 1B (Nb: 0.005). Therefore, in order to obtain the same degree of the effect as in Examples by containing niobium alone, a large amount of niobium is necessary, which is problematic in terms of cost.

Examples 1C to 4C and Comparative Examples 1C to 3C

Hereinafter, characteristics of the positive electrode active material containing lithium-nickel composite oxide satisfying the above amount of substance ratio C will be described with reference to Examples 1C to 4C and Comparative Examples 1C to 3C.

Example 1C

[Crystallization Process]

A predetermined amount of pure water was put into the reaction tank (60 L), and the temperature inside the tank was set to 49° C. while stirring the water. At this time, $N_2$ gas was allowed to flow into the reaction tank so that the dissolved oxygen concentration in the reaction tank liquid was sufficiently decreased. A 2.0 M mixed aqueous solution of nickel sulfate and cobalt sulfate so that the molar ratio among nickel:cobalt:aluminum was 82:15:3, a sodium aluminate aqueous solution having a concentration of 10 g/L, a 25% by mass sodium hydroxide solution as an alkaline solution, and 25% by mass of ammonia water as a complexing agent were continuously added into this reaction tank at the same time, and crystallization by a continuous crystallization method was performed.

At the time, the flow rate was controlled so that the residence time of the mixed aqueous solution was 8 hours, the pH in the reaction tank was adjusted to 11.6 to 12.4, and the ammonia concentration was adjusted to 10 to 14 g/L. After the reaction tank was stabilized, a slurry containing nickel-cobalt-aluminum composite hydroxide was collected through the overflow port and filtered to obtain a cake of nickel-cobalt-aluminum composite hydroxide. Impurities were washed by allowing 1 L of pure water to pass through 140 g of nickel-cobalt-aluminum composite hydroxide in the Denver used for filtration. The filtered powder was dried to obtain particles of nickel-cobalt-aluminum composite hydroxide in which an amount of substance ratio of nickel, cobalt, and aluminum is represented as Ni:Co:Al=0.82:0.15:0.03.

[Mixing Process]

The obtained particles of nickel-cobalt-aluminum composite hydroxide, lithium hydroxide, titanium oxide ($TiO_2$), and niobic acid ($Nb_2O_5 \cdot 4H_2O$) were weighed so that the amount of substance ratio of lithium:(nickel+cobalt+aluminum):titanium:niobium was 1.01:0.973:0.022:0.005, and then thoroughly mixed together using a shaker mixer device (TURBULA Type T2C manufactured by Willy A. Bachofen (WAB) AG) to obtain a lithium mixture.

[Firing Process]

The obtained lithium mixture was held and fired at 810° C. for 10 hours in an oxygen (oxygen concentration: 90% by volume) flow, and then was crushed to obtain particles of lithium-nickel-cobalt-aluminum composite oxide (positive electrode active material).

[Evaluation]

The production conditions of the positive electrode active material is presented in Table 5 and evaluation results of the positive electrode active material thus obtained are presented in Table 6.

Example 2C

A positive electrode active material was obtained and evaluated in a similar manner to Example 1C, except that in the mixing process, the obtained particles of nickel-cobalt-aluminum composite hydroxide, lithium hydroxide, titanium oxide ($TiO_2$), niobic acid ($Nb_2O_5 \cdot 4H_2O$), and magnesium oxide (MgO) were weighed so that the amount of substance ratio of lithium:(nickel+cobalt+aluminum):titanium:niobium:magnesium was 1.01:0.970:0.022:0.005:0.003. The production conditions and evaluation results of the positive electrode active material are presented in Tables 5 and 6.

Example 3C

A positive electrode active material was obtained and evaluated in a similar manner to Example 1C, except that in the mixing process, the obtained particles of nickel-cobalt-aluminum composite hydroxide, lithium hydroxide, titanium oxide ($TiO_2$), niobic acid ($Nb_2O_5 \cdot 4H_2O$), and zirconium oxide ($ZrO_2$) were weighed so that the amount of substance ratio of lithium:(nickel+cobalt+aluminum):titanium:niobium:zirconium was 1.01:0.970:0.022:0.005:0.003. The production conditions and evaluation results of the positive electrode active material are presented in Tables 5 and 6.

Example 4C

A positive electrode active material was obtained and evaluated in a similar manner to Example 1C, except that in the firing process, firing was performed in an oxygen (oxygen concentration: 60% by volume) flow. The production conditions and evaluation results of the positive electrode active material are presented in Tables 5 and 6.

Comparative Example 1C

A positive electrode active material was obtained and evaluated in a similar manner to Example 1C, except that in the mixing process, a titanium compound and a niobium compound were not mixed, the obtained particles of nickel-cobalt-aluminum composite hydroxide and lithium hydroxide were weighed so that the amount of substance ratio of lithium:nickel:cobalt:aluminum was 1.02:0.817:0.147:0.036, and the firing temperature in the firing process was set to 760° C. The production conditions and evaluation results of the positive electrode active material are presented in Tables 5 and 6.

Comparative Example 2C

A positive electrode active material was obtained and evaluated in a similar manner to Example 1C, except that in the mixing process, a niobium compound was not mixed, the obtained particles of nickel-cobalt-aluminum composite hydroxide, lithium hydroxide, and titanium oxide ($TiO_2$) were weighed so that the amount of substance ratio of lithium:(nickel+cobalt+aluminum):titanium was 1.01:0.990:0.010, and the firing temperature in the firing process was set to 790° C. The production conditions and evaluation results of the positive electrode active material are presented in Tables 5 and 6.

Comparative Example 3C

A positive electrode active material was obtained and evaluated in a similar manner to Example 1C, except that in the mixing process, a titanium compound was not mixed, the obtained particles of nickel-cobalt-aluminum composite hydroxide, lithium hydroxide, and niobic acid ($Nb_2O_5 \cdot 4H_2O$) were weighed so that the amount of substance ratio of lithium:(nickel+cobalt+aluminum):niobium was 1.02:0.995:0.005, and the firing temperature in the firing process was set to 810° C. The production conditions and evaluation results of the positive electrode active material are presented in Tables 5 and 6.

TABLE 5

| | Mixing process | | Firing process | |
|---|---|---|---|---|
| | Titanium compound — | Niobium compound — | Oxygen concentration vol. % | Firing temperature ° C. |
| Example 1C | $TiO_2$ | $Nb_2O_5•4H_2O$ | 90 | 810 |
| Example 2C | $TiO_2$ | $Nb_2O_5•4H_2O$ | 90 | 810 |
| Example 3C | $TiO_2$ | $Nb_2O_5•4H_2O$ | 90 | 810 |
| Example 4C | $TiO_2$ | $Nb_2O_5•4H_2O$ | 60 | 810 |
| Comparative Example 1C | — | — | 90 | 760 |
| Comparative Example 2C | $TiO_2$ | — | 90 | 790 |
| Comparative Example 3C | — | $Nb_2O_5•4H_2O$ | 90 | 810 |

TABLE 6

| | Positive electrode active material | | | | | | | |
|---|---|---|---|---|---|---|---|---|
| | Amount of substance ratio | | | | | | | |
| | Li a | Ni — | Co x3 | A1 y3 | Mg(M) z3 | Zr(M) z3 | Ti b | Nb c |
| Example 1C | 1.01 | 0.794 | 0.143 | 0.036 | — | — | 0.022 | 0.005 |
| Example 2C | 1.01 | 0.791 | 0.143 | 0.036 | 0.003 | — | 0.022 | 0.005 |
| Example 3C | 1.01 | 0.791 | 0.143 | 0.036 | — | 0.003 | 0.022 | 0.005 |
| Example 4C | 1.01 | 0.794 | 0.143 | 0.036 | — | — | 0.022 | 0.005 |
| Comparative Example 1C | 1.02 | 0.817 | 0.147 | 0.036 | — | — | — | — |
| Comparative Example 2C | 1.02 | 0.809 | 0.145 | 0.036 | — | — | 0.010 | — |
| Comparative Example 3C | 1.02 | 0.814 | 0.145 | 0.036 | — | — | — | 0.005 |

| | Positive electrode active material | | | | | | Evaluation |
|---|---|---|---|---|---|---|---|
| | Ti/Nb amount of substance ratio — | Grain boundary/intraparticle Nb concentration — | Volume average particle size MV μm | Particle size distribution width — | Volume resistivity* Ω · cm | Discharge capacity mAh/g | Maximum oxygen generation peak intensity ratio** — |
| Example 1C | 4.5 | 1.5 | 13.1 | 0.81 | $1.1 \times 10^3$ | 171 | 0.35 |
| Example 2C | 4.5 | 1.6 | 13.3 | 0.82 | $1.5 \times 10^3$ | 169 | 0.33 |
| Example 3C | 4.5 | 1.5 | 13.1 | 0.82 | $1.3 \times 10^3$ | 172 | 0.37 |
| Example 4C | 4.5 | 1.5 | 12.9 | 0.81 | $2.4 \times 10^3$ | 159 | 0.31 |
| Comparative Example 1C | — | — | 13.2 | 0.82 | $3.4 \times 10^1$ | 202 | 1.00 |
| Comparative Example 2C | — | — | 12.8 | 0.81 | $1.6 \times 10^2$ | 189 | 0.59 |
| Comparative Example 3C | 0 | 1.3 | 13.5 | 0.82 | $3.7 \times 10^2$ | 187 | 0.71 |

*When compressed at 3.5 g/$cm^3$

**Peak intensity ratios at 200° C. to 300° C., when Comparative Example 1 is regarded as Ref.

(Evaluation Result 3)

Figure 8:
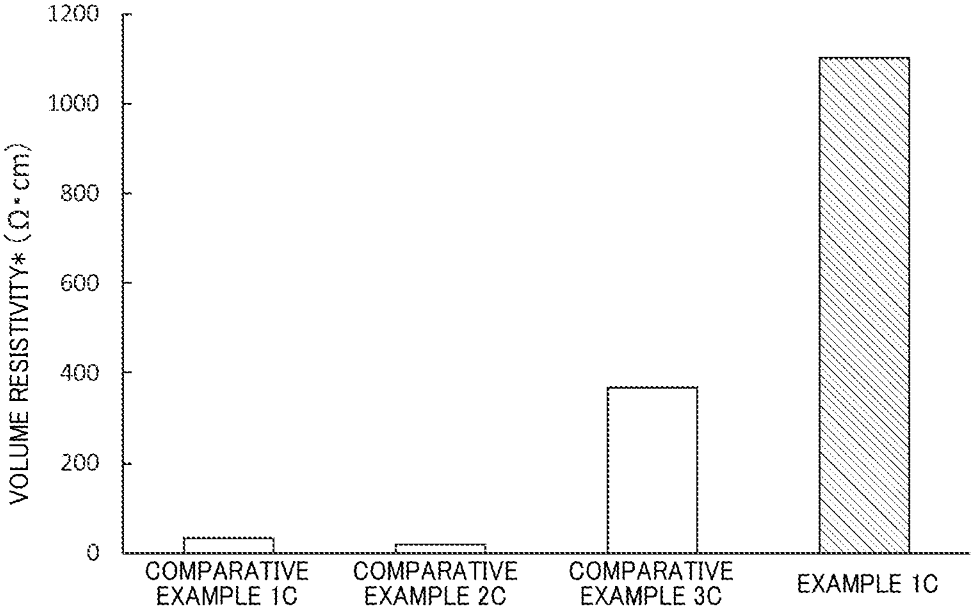
FIG. 8 is a graph showing volume resistivities of positive electrode active materials obtained in Comparative Examples 1C to 3C and Example 1C when compressed.

As shown in Tables 5 and 6 and FIGS. 7 and 8, it is clear that the positive electrode active materials obtained in Examples have a volume resistivity when compressed of $5.0\times10^2$ Ω·cm or more and a maximum oxygen generation peak intensity ratio of 0.50 or less, high thermal stability is attained, and oxygen releasing at the time of overcharge is suppressed.

Figure 9:
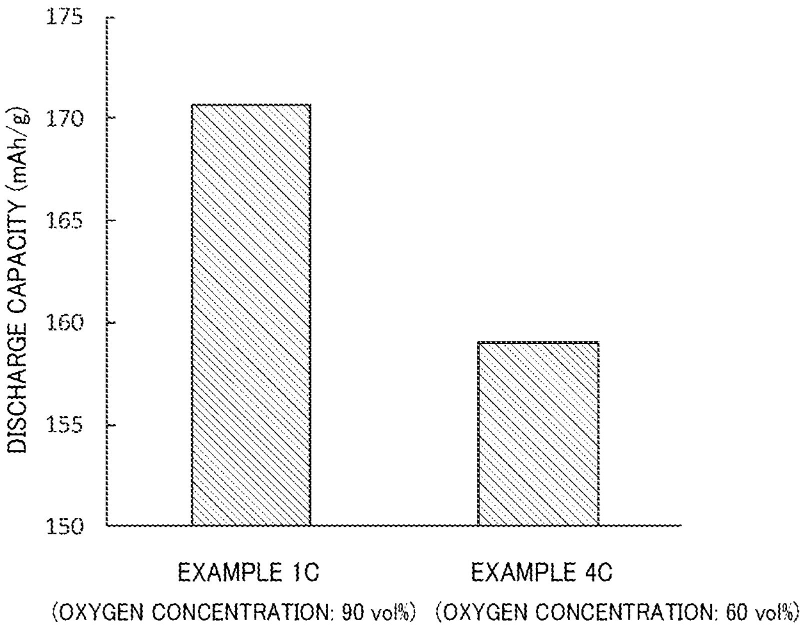
FIG. 9 is a graph showing discharge capacities of positive electrode active materials obtained in Examples 1C and 4C.

Furthermore, as shown in Tables 5 and 6 and FIG. 9, in Examples 1C to 3C in which firing was performed in an atmosphere having an oxygen concentration of 90 vol %, a positive electrode active material having a high discharge capacity of 165 mAh/g or more, high thermal stability, and a high battery capacity was obtained.

Further, as presented in Table 6, in positive electrode active materials obtained in Examples, the niobium concentration at the grain boundary between primary particles to the niobium concentration inside primary particles (grain boundary niobium concentration/intraparticle niobium concentration) was 1.3 times or more, and niobium was segregated to a grain boundary between primary particles. Furthermore, the segregation of titanium at the grain boundary between primary particles was not recognized, the titanium concentration at the grain boundary between primary particles with respect to the titanium concentration inside primary particles (titanium concentration at the grain boundary/titanium concentration in particles) was 0.8 times or more and 1.1 times or less.

On the other hand, since the positive electrode active material of Comparative Example 1C did not contain titanium and niobium, the volume resistivity when compressed and the maximum oxygen generation peak intensity ratio was low, and thermal stability was not sufficient.

Furthermore, since the positive electrode active materials of Comparative Examples 2C and 3C contain only one of titanium and niobium, the volume resistivity at the time of compression are slightly higher than those of Comparative Example 1C but are lower than Examples, and it cannot be said that thermal stability during short circuit is sufficient.

Furthermore, the maximum oxygen generation peak intensity ratio was higher in the positive electrode active material of Comparative Example 3C only containing niobium (Nb: 0.005) than the positive electrode active material of Example 1C (Nb: 0.005). Therefore, in order to obtain the same degree of the effect as in Examples by containing niobium alone, a large amount of niobium is necessary, which is problematic in terms of cost.

INDUSTRIAL APPLICABILITY

In the present embodiment, a positive electrode active material for a lithium ion secondary battery having high thermal stability and excellent battery characteristics can be obtained by an industrial production method. This lithium ion secondary battery is suitable for a power source of a small portable electronic device (such as a notebook personal computer or a mobile phone terminal) that is required to have a high capacity all the time.

Furthermore, the secondary battery using the positive electrode active material according to the present embodiment is excellent in thermal stability and further excellent in capacity also in comparison with a battery using a conventional positive electrode active material of a lithium-nickel-based oxide. Hence, the secondary battery is suitably used as a power source for electric cars that are restricted in a mounting space since miniaturization thereof is possible.

Furthermore, the secondary battery using the positive electrode active material according to the present embodiment can be used not only as a power source for electric cars driven purely by electric energy but also as a power source and a stationary storage battery for so-called hybrid cars used together with a combustion engine such as a gasoline engine or a diesel engine.

Note that, the technical scope of the present invention is not limited to the aspects described in the above embodiment and the like. One or more of the requirements described in the above embodiment and the like may be omitted. Furthermore, the requirements described in the above embodiment and the like can be combined as appropriate. In addition, to the extent permitted by law, the disclosure of Japanese Patent Application No. 2019-127261, which is a Japanese patent application, and all the literatures cited in this specification is incorporated as part of the description of the text.

REFERENCE SIGNS LIST

CBA Coin-type battery (for evaluation)
PE Positive electrode (electrode for evaluation)
NE Negative electrode
SE Separator
GA Gasket
WW Wave washer
PC Positive electrode can
NC Negative electrode can
G Void

The invention claimed is:

1. A positive electrode active material for a lithium ion secondary battery, the positive electrode active material comprising a lithium-nickel composite oxide having a hexagonal layered structure and configured by secondary particles with a plurality of aggregated primary particles, wherein the lithium-nickel composite oxide contains lithium (Li), nickel (Ni), manganese (Mn), titanium (Ti), niobium (Nb), and optionally an element M1 that is at least one element selected from the group consisting of Co, V, Mg, Mo, Ca, Cr, Ta, Na, W, Fe, Zn, B, Si, P, Zr, and Al, an amount of substance ratio of the respective elements is represented as Li:Ni:Mn: M1:Ti:Nb=a:(1−x1−y1−b−c):x1:y1:b:c (provided that, $0.97 \leq a \leq 1.25$, $(1-x1-y1-b-c)<0.80$, $0.03 \leq x1 \leq 0.35$, $0 \leq y1 \leq 0.35$, $0.005 \leq b \leq 0.05$, and $0.001<c \leq 0.03$), and in the amount of substance ratio, $(b+c) \leq 0.06$ and $b>c$ are satisfied, wherein the niobium (Nb) is segregated at a grain boundary between the primary particles, wherein a niobium concentration at the grain boundary between the primary particles, as determined by point analysis using STEM-EDX, with respect to a niobium concentration inside the primary particles of the lithium-nickel composite oxide is 1.3 times or more, and wherein a titanium concentration at the grain boundary between the primary particles, as determined by point analysis using STEM-EDX, with respect to a titanium concentration inside the primary particles of the lithium-nickel composite oxide, is less than 1.3 times.

2. The positive electrode active material for a lithium ion secondary battery according to claim 1, wherein a volume resistivity, as determined by powder resistivity measurement, when compressed to 3.5 g/cm$^3$ is $1.0 \times 10^3$ Ω·cm or more and $1.0 \times 10^5$ Ω·cm or less.

3. The positive electrode active material for a lithium ion secondary battery according to claim 1, wherein [(D90−D10)/Mv] indicating a particle size distribution width calculated by D90, D10 and a volume average particle size (Mv) in a particle size distribution by a laser diffraction scattering method is 0.80 or more and 1.20 or less.

4. The positive electrode active material for a lithium ion secondary battery according to claim 1, wherein a volume average particle size Mv is 8 μm or more and 20 μm or less.

5. The positive electrode active material for a lithium ion secondary battery according to claim 1, wherein "c" indicating the amount of substance ratio of Nb in the amount of substance ratio is $0.002 \leq c \leq 0.03$.

6. A lithium ion secondary battery comprising: a positive electrode; a negative electrode; and a non-aqueous electrolyte, the positive electrode containing the positive electrode active material for a lithium ion secondary battery according to claim 1.

7. A positive electrode active material for a lithium ion secondary battery, the positive electrode active material comprising a lithium-nickel composite oxide having a hexagonal layered structure and configured by secondary particles with a plurality of aggregated primary particles, wherein the lithium-nickel composite oxide contains lithium (Li), nickel (Ni), manganese (Mn), titanium (Ti), niobium (Nb), and optionally an element M2 that is at least one element selected from the group consisting of Co, V, Mg, Mo, Ca, Cr, Ta, Na, W, Fe, Zn, B, Si, P, Zr, and Al, an amount of substance ratio of the respective elements is represented as Li:Ni:Mn:M2:Ti:Nb=a:(1−x2−y2−b−c):x2:y2:b:c (provided that, $0.97 \leq a \leq 1.25$, $0.880<(1-x2-y2-b-c)$, $0.01 \leq x2 \leq 0.113$, $0 \leq y2 \leq 0.103$, $0.005 \leq b \leq 0.05$, and $0.001<c \leq 0.03$), and in the amount of substance ratio, $(b+c) \leq 0.06$ and $b>c$ are satisfied, and wherein the niobium (Nb) is segregated at a grain boundary between the primary particles, wherein a niobium concentration at the grain boundary between the primary particles, as determined by point analysis using STEM-EDX, with respect to a niobium concentration inside the primary particles of the lithium-nickel composite oxide is 1.3 times or more, and wherein a titanium concentration at the grain boundary between the primary particles, as determined by point analysis using STEM-EDX, with respect to a titanium concentration inside the primary particles of the lithium-nickel composite oxide is less than 1.3 times.

8. The positive electrode active material for a lithium ion secondary battery according to claim 7, wherein a volume resistivity, as determined by powder resistivity measurement, when compressed to 3.5 g/$cm^3$ is $1.0\times10^2$ Ω·cm or more and $1.0\times10^5$ Ω·cm or less.

9. A positive electrode active material for a lithium ion secondary battery, the positive electrode active material comprising a lithium-nickel composite oxide having a hexagonal layered structure and configured by secondary particles with a plurality of aggregated primary particles, wherein the lithium-nickel composite oxide contains lithium (Li), nickel (Ni), cobalt (Co), aluminum (Al), titanium (Ti), niobium (Nb), and optionally an element M3 that is at least one element selected from the group consisting of Mn, V, Mg, Mo, Ca, Cr, Ta, Na, W, Fe, Zn, B, Si, P, and Zr, an amount of substance ratio of the respective elements is represented as Li:Ni:Co:Al:M3:Ti:Nb=a:(1−x3−y3−z3−b−c):x3:y3:z3:b:c (provided that, $0.97\leq a\leq1.25$, $0.01\leq x3\leq0.25$, $0.005\leq y3\leq0.15$, $0\leq z3\leq0.15$, $0.005\leq b\leq0.05$, $0.001<c\leq0.03$), and in the amount of substance ratio, $(b+c)\leq0.06$ and $b>c$ are satisfied, and wherein the niobium (Nb) is segregated at a grain boundary between the primary particles, wherein a niobium concentration at the grain boundary between the primary particles, as determined by point analysis using STEM-EDX, with respect to a niobium concentration inside the primary particles of the lithium-nickel composite oxide is 1.3 times or more, and wherein a titanium concentration at the grain boundary between the primary particles, as determined by point analysis using STEM-EDX, with respect to a titanium concentration inside the primary particles of the lithium-nickel composite oxide is less than 1.3 times.

10. The positive electrode active material for a lithium ion secondary battery according to claim 9, wherein a volume resistivity, as determined by powder resistivity measurement, when compressed to 3.5 g/$cm^3$ is $5.0\times10^2$ Ω·cm or more and $1.0\times10^5$ Ω·cm or less.

* * * * *